United States Patent
Ogawa

(10) Patent No.: US 9,608,986 B2
(45) Date of Patent: Mar. 28, 2017

(54) USER AUTHENTICATION METHOD AND USER AUTHENTICATION SYSTEM

(71) Applicant: Passlogy Company Ltd., Tokyo (JP)

(72) Inventor: Hideharu Ogawa, Tokyo (JP)

(73) Assignee: Passlogy Company Ltd., Tokyo (JP)

( * ) Notice: Subject to any disclaimer, the term of this patent is extended or adjusted under 35 U.S.C. 154(b) by 191 days.

(21) Appl. No.: 14/322,577

(22) Filed: Jul. 2, 2014

(65) Prior Publication Data

US 2015/0006903 A1 Jan. 1, 2015

Related U.S. Application Data

(60) Continuation of application No. 13/233,869, filed on Sep. 15, 2011, now Pat. No. 8,812,862, which is a (Continued)

(30) Foreign Application Priority Data

Feb. 13, 2002 (JP) .................................. 2002-36056

(51) Int. Cl.
*H04L 29/06* (2006.01)
*G06F 21/31* (2013.01)
(Continued)

(52) U.S. Cl.
CPC ............ *H04L 63/083* (2013.01); *G06F 21/31* (2013.01); *G06F 21/33* (2013.01); *G06F 21/36* (2013.01); *H04L 63/104* (2013.01)

(58) Field of Classification Search
CPC ..... H04L 63/083; H04L 63/104; G06F 21/33; G06F 21/36; G06F 21/31
See application file for complete search history.

(56) References Cited

U.S. PATENT DOCUMENTS 5,428,349 A  6/1995 Baker
5,481,720 A  1/1996 Loucks et al.
(Continued)

FOREIGN PATENT DOCUMENTS

EP  2557507 A2 *  2/2013  ............. G06F 21/31

OTHER PUBLICATIONS

Office Action in corresponding Canadian application No. 2475822, dated Jun. 16, 2014 (3 pages).
(Continued)

*Primary Examiner* — Matthew Smithers
(74) *Attorney, Agent, or Firm* — Osha Liang LLP

(57) ABSTRACT

A verification server is configured to communicate with a usage target system via a first communication channel and an information terminal device via a second communication channel. The verification server includes: a unit for registering personal information of a user for using a usage target system; a unit for receiving, via the second communication channel, system identification information of the usage target system and a restriction code from an information terminal device owned by a use; a unit for generating an internal system password for the usage target system; a unit for receiving, via the first communication channel, a plurality of characters from the usage target system, the plurality of characters being inputted by a user into the usage target system; and a unit for determining whether the plurality of characters are legitimate based on the internal system password and the system identification information.

14 Claims, 27 Drawing Sheets

Related U.S. Application Data division of application No. 10/504,940, filed as application No. PCT/JP03/01498 on Feb. 13, 2003, now Pat. No. 8,140,854.

(51) Int. Cl.
*G06F 21/33* (2013.01)
*G06F 21/36* (2013.01)

(56) References Cited

U.S. PATENT DOCUMENTS 5,822,518 A * 10/1998 Ooki ................. G06F 21/41
                                                                709/229
8,140,854 B2 * 3/2012 Ogawa .............. H04L 63/083
                                                                713/182

OTHER PUBLICATIONS

Office Action in counterpart European Patent Application No. 12 184 239.7 issued Nov. 4, 2016 (4 pages).

* cited by examiner

USAGE TARGET SYSTEM SCREEN

MOBILE PHONE SCREEN

MOBILE PHONE SCREEN

FIG.22

| SYSTEM ID 51 | USER ACCOUNT 52 | USER ID 53 | PASSWORD DERIVATION PATTERN 54 | TEMPORARY IDENTIFICATION INFORMATION 56 | PER-SYSTEM USER IDENTIFICATION INFORMATION 57 |
|---|---|---|---|---|---|
| 36578979 | ogawa | 090xxxx1234 | 1, 17, 33, 48 | | 125896 |
| 36578980 | ogawa | 090xxxx1234 | 16, 30, 23, 55 | 6584 | 125897 |
| 36578981 | ogawa | 090xxxx1234 | 15, 2, 19, 22 | | 125898 |
| 56578979 | taro | 030xxxx5678 | F4762 | | | ogawa

FIG.23

| EVENT ID | SYSTEM ID | USER ID | PRESENTED PATTERN | TEMPORARY IDENTIFICATION INFORMATION |
|---|---|---|---|---|
| 100 | 36578979 | 090xxxx1234 | 58798... | 6584 |
| .. | .. | .. | .. | .. |
| .. | .. | .. | .. | .. |

| FUNCTION CODE | PROCESSING FOR NOTIFICATION |
|---|---|
| 0 | FOR PRACTICE |
| 1 | READ ONLY |
| 2 | EMERGENCY |
| : | : |
| : | : |
| 9 | DUMMY |
| : | : |
| : | : |

USER AUTHENTICATION METHOD AND USER AUTHENTICATION SYSTEM

CROSS-REFERENCES

The present application is a continuation application, and thus claims benefit pursuant to 35 U.S.C. §120, of U.S. patent application Ser. No. 13/233,869 filed on Sep. 15, 2011, which is a divisional application and thus claims benefit pursuant to 35 U.S.C. §121, of U.S. patent application Ser. No. 10/504,940 filed on Aug. 13, 2004, which issued as U.S. Pat. No. 8,140,854 on Mar. 20, 2012, which This application relates to and claims priority from Japanese Patent Application No. 2002-36056, filed on Feb. 13, 2002, the entire disclosure of which is incorporated herein by reference.

BACKGROUND

The present invention relates to a user verification method, and a user verification system for realizing the same.

In recent years, various information apparatuses, of which computers are representative, have become widespread. In particular, mobile phones provided with electronic mail functions and internet connection functions have spread extremely quickly, and have become necessary information items for people.

As this information society advances, illegitimate access to systems, and other such security problems, are becoming extremely important. In order to prevent illegitimate access to systems, traditionally, a common method is to use a pre-registered user ID and password to perform user verification. However, in order to answer to a need for even stronger security levels, proposals have been made for various user verification methods adapted to usage environments and objectives.

One of these is user verification system which limits terminal devices that can access a system. This method rests on a premise that the person who owns the terminal device is the person using it. For example, when accessing a given system from a mobile phone, a per-unit identification number that is assigned to that mobile phone can be used to achieve more secure user verification.

Furthermore, user verification using a random number table is also known. In this user verification using the random number table, random number table cards with random number tables written thereon are issued in advance to each user, and each time the user verification is performed, the system designates a character at a freely chosen position in the random number table, and has the user input it. Accordingly, since the inputted character changes each time, this method is effective against "eavesdropping".

In user verification performed on the system, leaking ("eavesdropping") of the password being used there results in causing extremely serious security problems. Therefore, management of the password by the user is extremely important, and each of the users having "responsibility" in their own actions is fundamental when considering the security problems of the system.

In general, different passwords used for the user verification are required for each system, and the formats thereof are varied. As such, users who use many systems must manage many passwords, and password management becomes a burden for the user. The user, because of the nature of passwords, should strive to maintain the password in his or her memory, but when managing many passwords, it is not rare to write these down in a notebook or the like. Furthermore, users who find password management troublesome have set their passwords with characters that are easy to remember, or have set the same characters for the password for each system to manage them in an integrated fashion.

However, such actions by the user with respect to password management mean that the system is exposed to security risks. As long as the user acts in this way, the originally intended user verification with the password has essential security problems.

Furthermore, even when the user pays careful attention when managing the password, for example, there were still security problems, such as when the password being inputted into a terminal device in a shop is illegitimately observed, or when an "eavesdropping" mechanism gets built into the terminal device itself, whereby the password leaks to a third party.

Furthermore, even in user verification as described above where the mobile phones that can access the system are limited, when a user loses a mobile phone or it is stolen or comes into the possession of a third party, there is only the security level equivalent to when traditional user verification is performed, and thus this type of user verification had difficulties effectively preventing illegitimate access to the system. This was similar even in user verification using the random number tables.

SUMMARY

Therefore, in order to solve the above-mentioned problems, an object of this invention is to provide a new user verification method and a system for realizing the same, which effectively prevent illegitimate access to a system by a third party.

Furthermore, it is another object of the present invention to provide such a user verification method and a system for realizing the same, which maximally utilize existing system infrastructure, so as not to incur excess cost burden.

Furthermore, it is yet another object of the present invention to provide a user verification method and a system for achieving the same, that effectively prevent illegitimate access to the system, while also making password management by the user easy, and are convenient to use for every user. By extension, it is an object of the present invention to eliminate essential security problems arising from actions by the users.

Furthermore, it is yet another object of the present invention to provide a registration method and a user interface for achieving such registration method, for registering a "password" that is used in the verification methods described above and in the systems for achieving the user verification methods.

The present invention is a user verification method and user verification system, in which a password derivation pattern for each user is pre-registered into a verification server, and then when the user is to use a used target system, the verification server generates a presented pattern and presents this to the user. The user then inputs a character string corresponding to the user's own password derivation pattern for the presented pattern. The verification server then performs a confirmation of the inputted character string based on the presented pattern and that user's own password derivation pattern, and the confirmation result is then notified to the used target system.

The "password derivation pattern" refers to a specific element (group) which the user freely selects from an element group constituting an overall pattern. More specifically, the password derivation pattern is an array pattern or array rule that shows how which element group was selected from a matrix which is the overall pattern. It should be noticed here that the password derivation pattern does not refer to the specific values of specific elements in the overall pattern, but ultimately merely indicates the information of which element was selected.

More specifically, according to a first aspect, the present invention is a user verification method comprising the steps of a registration step of registering a password derivation pattern based on a specific element selected from among a group of elements constituting a predetermined pattern; a reception step of receiving system identification information assigned to a usage target system, which is sent from an information terminal device of a user; a generation step of generating a presented pattern in which a predetermined character is assigned to each element of the element group constituting the predetermined pattern when the system identification information is received from the information terminal device; an input step of presenting a predetermined screen containing the generated presented pattern onto the information terminal device, and urging the user to input a character assigned to a specific element corresponding to the password derivation pattern; a judgment step of receiving the inputted character from the usage target system, and judging whether or not the received character is legitimate based on the presented pattern and the user's password derivation pattern; and a notification step of notifying the result that was judged to the usage target system.

Furthermore, according to a second aspect, the present invention is a user verification method comprising the steps of registering a password derivation pattern based on a specific element selected from among a group of elements constituting a predetermined pattern; receiving system identification information assigned to a usage target system, which is sent from a user's information terminal device; generating a presented pattern in which a predetermined character is assigned to each element of the element group constituting the predetermined pattern when the predetermined identification information is received from the information terminal device; presenting a predetermined screen containing the generated presented pattern onto the information terminal device, and urging the user to input the character assigned to a specific element corresponding to the password derivation pattern; receiving the inputted character from the information terminal device, and judging whether or not the received character is legitimate based on the presented pattern and the user's password derivation pattern; and notifying the result of the judgment to the usage target system.

The above-mentioned method invention can be understood as a device invention. Furthermore, these inventions can be achieved as programs and as storage media storing such programs which, together with predetermined hardware, achieve predetermined functions by being executed on a computer.

Note that, in the present specification, "means" refers not to simply physical means, but also includes cases where software achieves a function of the means. Furthermore, a function of one means may be achieved by two or more physical means, and functions of two or more means may be achieved by one physical means.

DESCRIPTION OF DRAWINGS

FIG. 22 is a diagram showing an example of a data structure of a verification database 14;

FIG. 23 is a diagram showing an example of a user verification request waiting table;

FIG. 29 is a diagram showing a function code database that corresponds processing for informing a usage target system 11 with a function code which is a character associated corresponding to that processing.

DETAILED DESCRIPTION

Next, embodiments of the present invention are explained with reference to the drawings. The following embodiments are illustrative examples for explaining the present invention, and are not intended to restrict the present invention to the embodiments. The present invention can be reduced to practice in various embodiments provided it is done so without departing from the essence of the present invention.

First Embodiment

Figure 1:
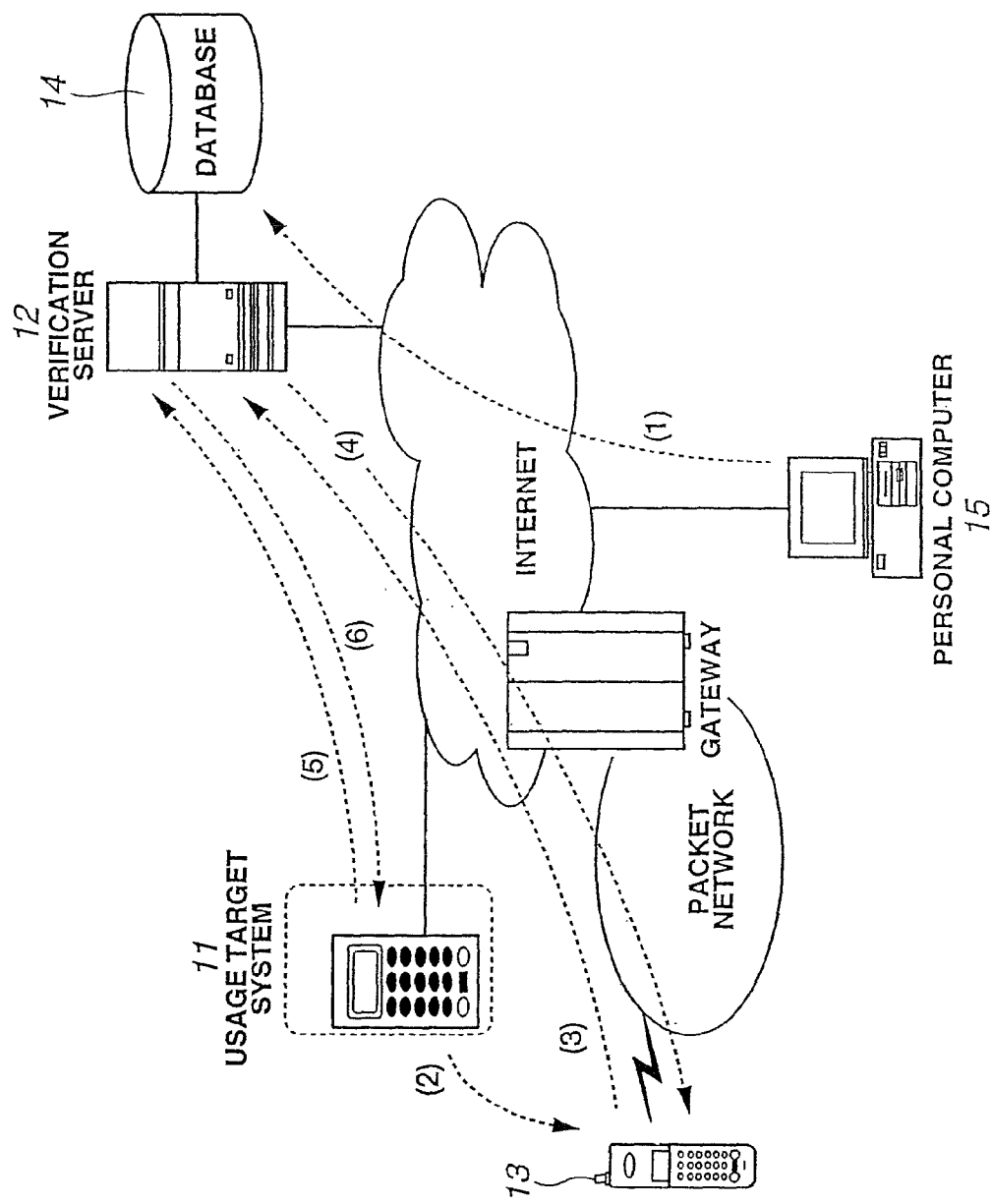
FIG. 1 is a summary diagram for explaining an overall scheme of a user verification method in accordance with an embodiment of the present invention.

FIG. 1 is a summary diagram for explaining an overall scheme of a user verification method in accordance with the present embodiment. As shown in FIG. 1, a usage target system 11 is connected to a verification server 12 via a communications line. Here, an example is shown in which the usage target system 11 is connected to the verification server 12 via the Internet. The usage target system 11 is a system that requests user verification to enable usage by the user. The usage target system 11, by means of user verification processing which is described below, approves usage for a user who is judged to be legitimate. As an example of application of the usage target system 11, stereotypically, a security room key opening/closing system or credit card payment terminal device can be given, but may also be a site for members on the Internet which is realized as virtual space.

This type of usage target system 11 stores a unique system ID (system identification information) on an internal ROM. Furthermore, the usage target system 11 preferably has a user interface for providing a dialogic operating environment to a user. The user interface, for example, is constituted by means of a 10-key and a corresponding display. The usage target system 11, via the user interface, receives a "start usage" instruction from the user, and displays a system ID to the user, and also receives a password input from the user and displays a user verification result.

A wireless terminal device 13 is a portable-type information terminal device having wireless communications functions, stereotypically corresponding to a mobile phone or PDA. Here, explanation is given using a mobile phone as an example. The mobile phone 13 can connect from a packet communications network through a gateway to various nodes (e.g., the verification server 12) on the Internet. The mobile phone 13, when using the usage target system 11, is used to provide, to the user, reference information for deriving a password necessary for user verification.

The verification server 12 performs verification of a user trying to set the usage target system 11, and notifies the verification result to the usage target system 11. The verification server 12 is provided with a verification database 14 that manages registration data that is necessary for the user verification and has been received in advance from the user. The verification database 14 manages, as the registration data, information relating to users who can use the usage target system 11, and information relating to the type of password derivation rule that has been registered by that user. The information about the password derivation rule is a password derivation pattern and a conversion rule that are described below. The verification server 12 has a Web server function in order to receive the registration data from the user online.

The verification server 12 and the verification database 14, stereotypically, can be realized using a general-purpose computer system. The verification server 12 is connected so as to be able to communicate with individual usage target systems 11 via communications lines. In such a case, it is preferable to establish secure communications. As in the present embodiment, when the usage target system 11 and the verification server 12 are connected via the Internet, SSL communications or other such security communications techniques can be applied to establish practical, secure communications. Note that, without going through the Internet, it is also possible to connect these by means of a dedicated line.

A personal computer 15 is a terminal device used for the user to register the password derivation pattern into the verification database 14. The personal computer 15 is constructed so as to be able to connect to the Internet, and has a Web client function. The user, in order to register the registration data that is necessary for the user confirmation into the verification database 14, uses a Web browser to access the verification server 12.

Note that, in order for the user to register the password derivation pattern into the verification database 14, instead of the personal computer 15, it is also possible to use the mobile phone 13. In the present embodiment, the main reason why the personal computer 15 is used is because, generally, personal computers 15 are functionally superior to mobile phones 13 in terms of their user interfaces. In another embodiment, explanation is given regarding an example in which the user interface of the mobile phone 13 is used to register the password derivation pattern.

The "password derivation pattern" indicates a specific group of elements selected freely by the user, from among a group of elements constituting a given overall pattern. To explain more specifically, it refers to an array pattern or an array rule that shows which element group in the matrix that is the entire pattern was selected and how. Here, it should be noted that the password derivation pattern does not refer to a specific value itself which is plugged into a specific element within the overall pattern, but rather ultimately indicates merely the information of which element was selected and how.

Figure 2A:
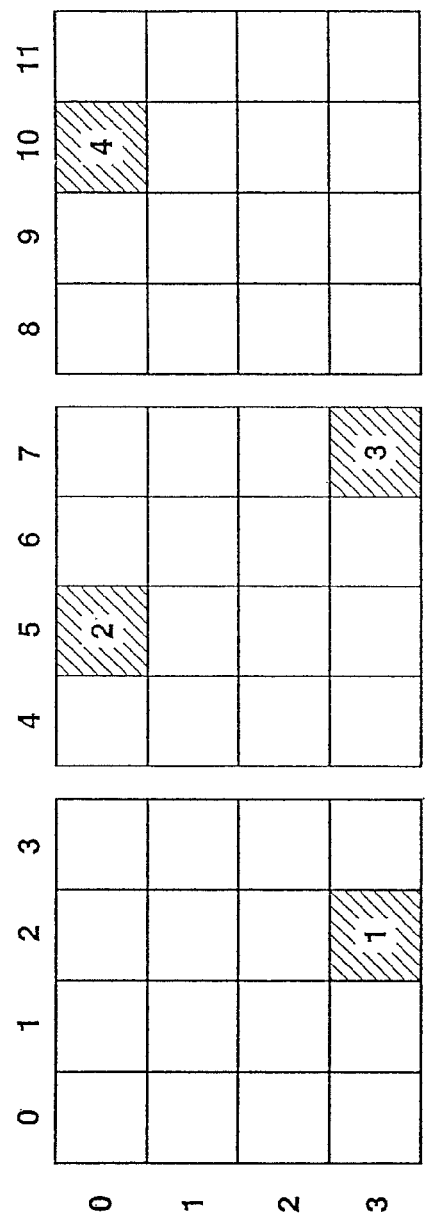
FIGS. 2A and 2B are diagrams for explaining a password derivation pattern in accordance with an embodiment of the present invention.
Figure 2B:
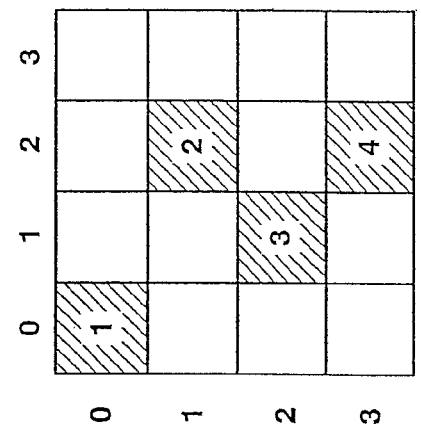

FIG. 2A and FIG. 2B are diagrams for explaining the password derivation pattern. FIG. 2A is a diagram showing an example where a 4-row, 12-column matrix is the overall pattern. In FIG. 2A and FIG. 2B, hatching appears in the selected elements, and numeric characters appear in the elements in the sequence of selection. Therefore, the password derivation pattern in this case can be expressed, if the matrix expression is used, as "(3, 2)-(0, 5)-(3, 7)-(0, 10)".

FIG. 2B is a diagram showing an example in which a 4-row, 4-column matrix is the overall pattern. In this case, the password derivation pattern can be expressed, if the matrix expression is used, as "(0, 0)-(1, 2)-(2, 1)-(3, 2)".

The password derivation pattern is used to perform the user verification with respect to the usage target system 11, and thus should be remembered by the user. As such, it can be said that the password derivation pattern is a type of password. The number of elements and the number of columns constituting the password derivation pattern are freely determinable, and may be set appropriately according to the security level in the user verification.

In a case where the password is a numeric character string of J digits, the overall pattern preferably is a matrix of K rows and L columns, so as to fulfill the following condition.

$$10^J < (K*L)*(K*L-1) \ldots (K*L-J+1) \quad \text{Formula (1)}$$

In a conventional verification method, when the password is a numeric character string of J digits, there are 10 times J number of password combinations. On the other hand, according to the verification method of the present embodiment, when the overall pattern is a K-row, L-column matrix, there are $(K*L)*(K*L-1) (K*L-J+1)$ combinations of password derivation patterns. Therefore, by constructing the overall pattern so as to satisfy the above-mentioned formula (1), the number of combinations can be increased more than in the conventional verification method, and the security level can be raised. That is, in accordance with the present embodiment, the number of digits of the password that should be inputted into the usage target system 11 can easily raise the security level above the conventional verification method, simply by changing the structure of the matrix, even when in the same case of the conventional verification method.

Returning to FIG. 1, a summary explanation is given regarding processing flow in the user verification method in accordance with the present embodiment.

First, the user uses the personal computer 15 to pre-register his or her own password derivation pattern for the usage target system 11 into the verification database 14 ((1) in the diagram). When the user actually tries to use the usage target system 11, in order to obtain the system ID thereof, the user operates the user interface of the usage target system 11, to make the system display the system ID ((2) in the diagram).

Next, the user inputs the system ID into the mobile phone 13, and sends to the verification server 12 ((3) in the diagram). The verification server 12 receives the system ID, generates a random number table, and sends this table to the user's mobile phone 13 as a presented pattern ((4) in the diagram). The user references the presented pattern on the mobile phone 13, and inputs the sequence (numeric character string) of element values in his or her own password derivation pattern into the usage target system 11 as the password. Accordingly, the usage target system 11 sends the password to the verification server 12 ((5) in the diagram).

When the verification server 12 receives the password from the usage target system 11, the verification server 12 compares a numeric character string obtained from the user's password derivation pattern which is already registered and the generated password derivation pattern, and the password sent from the usage target system 11, and judges whether or not these match each other. The verification server 12 sends a notification of the verification success when they do match each other, and a notification of verification failure when they do not match each other, to the usage target system 11 indicated by the system ID ((6) in the diagram). When the usage target system 11 receives the notification of verification success from the verification server 12, the usage target system 11 permits usage by that user.

In this way, the password that the user should input is a temporary one that is determined from the random number table generated each time user verification is performed, and according to the password derivation pattern pre-registered in advance. Therefore, even if the inputted password were to leak to a third party, the password itself would be completely meaningless the next time user confirmation is performed, and so illegitimate access will be effectively prevented. Furthermore, this type of password derivation pattern which the user should remember is not the conventional "specific numeric characters", but a pattern which is "conceptual, diagrammatic", and therefore has a quality of being easy to remember and difficult to forget for the user, thus being suitable for password management.

Next, explanation is given regarding the registration data that is used in the user verification. In order for the user to use the usage target system 11, before usage, the user must obtain a user account (user name) for the usage target system 11, and also must register a password derivation pattern for that user name. Therefore, the verification database 14 manages, as the registration data, which usage target system 11 has given usage rights to what sort of user, and what sort of password derivation patterns have been registered by each of the individual users who have been given usage rights.

Registration of the user account for the usage target system 11, stereotypically, is conceivable in a form where the manager of the usage target system 11 receives a request from the user and performs it, or where it is performed by the user him- or herself. Which way to register the user account can be chosen appropriately according to the operation policy of the usage target system 11. As means for achieving the same, various existing techniques may be applied. Below, regarding the user account for the usage target system 11, it is assumed that the manager registered the user account into the verification database 14, and explanation is given regarding procedures for the user to register the password derivation pattern.

Figure 3:
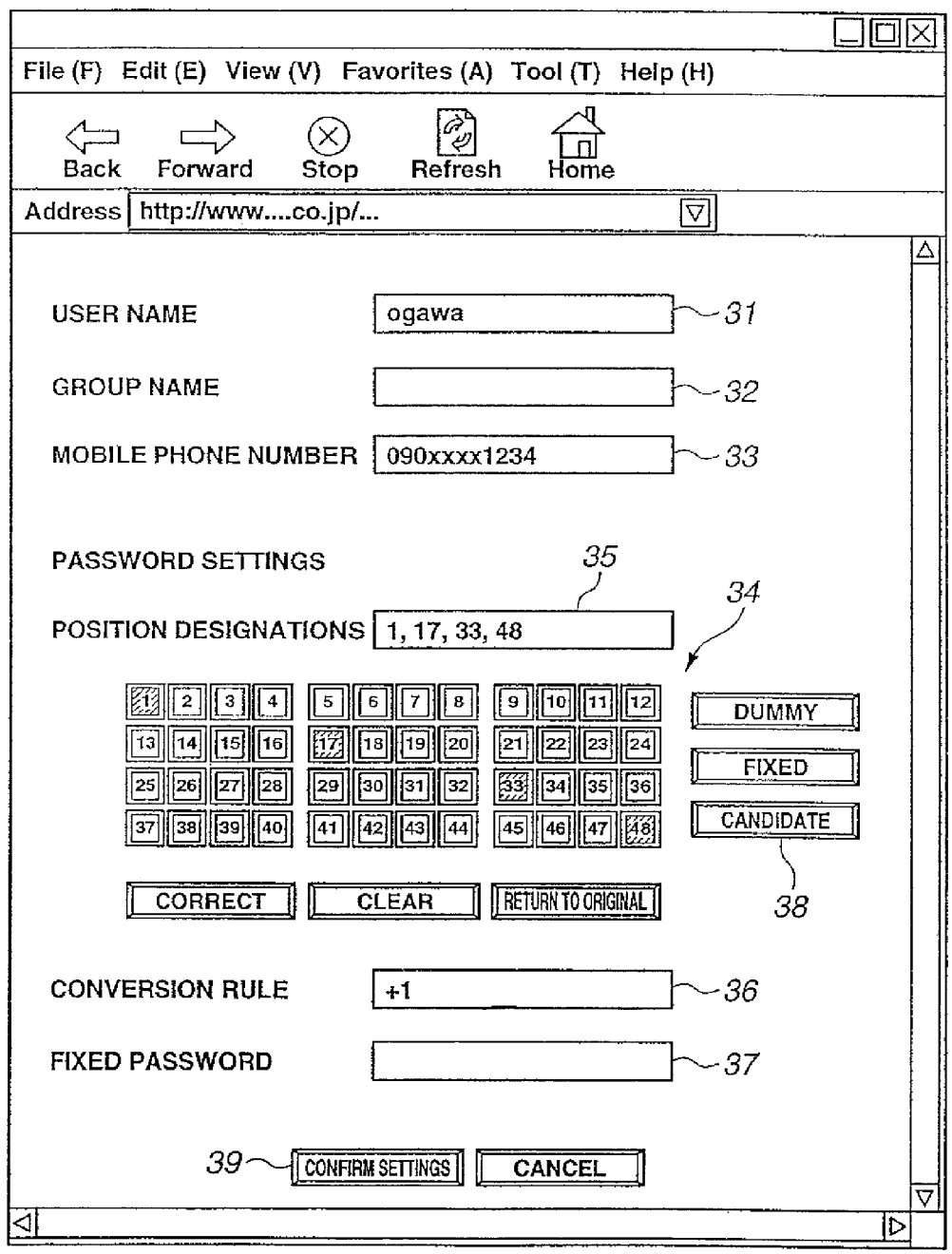
FIG. 3 is a diagram showing an example of a password derivation pattern registration screen displayed on a personal computer in accordance with an embodiment of the present invention.

FIG. 3 shows an example of a password derivation pattern registration screen that is displayed on the personal computer 15. This registration screen is constituted by page data that is described by HTML or other such page authoring language. The user operates a Web browser to access the verification server 12, to have this registration screen displayed on the personal computer 15. For example, a method may be used in which, at the point in time where the user account for the usage target system 11 was registered, the manager sends, by e-mail, mail contents that contain a URL of page data constituting the registration screen, to that user's e-mail address, and the user that received this selects the URL from the mail contents, whereby the registration screen is provided to the user.

In the same diagram, a user name input field 31 is a field for inputting the user name (user account) that uses the usage target system 11. Since the user account is already registered with the manager, a construction may be used in which the user does not have to input the user account again, and the user account is filled in into the user name input field 31 in advance.

A group name input field 32 is a field for inputting a group name to which the user belongs. However, in order to simplify explanations, in the present embodiment it is not necessary to input the group name.

A mobile phone number input field 33 is a field for inputting individual identification information for identifying the mobile phone 13 to be used in the user verification when using the usage target system 11. In accordance with the present embodiment, a mobile phone number, which has been assigned to the mobile phone 13 owned by the user, is used. Note that, a construction may be used in which the mobile phone 13 number is also registered with the manager and filled in into the mobile phone number input field 33 in advance.

An overall pattern 34 is constituted by a button object, in which a group of 48 elements are aligned in a 4-row, 12-column matrix shape. Each of the elements are given serial numbers from 1 to 48 as element names, in order to distinguish individual elements.

A position designation input field 35 is a field for designating and inputting one or more specific elements selected from the entire pattern 34 by using their element names. In the present example, elements "1", "17", "33" and "48" have been inputted. In the case where a plurality of elements are inputted, the individual elements are divided by a delimiter (e.g., a comma). Furthermore, the same elements may be inputted. Here, the sequence of inputted elements is the password derivation pattern. The sequence of elements can include a dummy "*". In the case where the user inputs the dummy "*", it is treated as a request to set an optional character. Here, along with the conversion rule shown below, this dummy prevents a third party from extrapolating the password derivation pattern. That is, since the password derivation pattern has a tendency toward a pattern that is easy for the user to remember, a meaningless character can be inserted between the characters that constitute the actual password, so as to prevent extrapolation. For example, in a sequence of 8 elements where the first 4 elements are dummies, the user can input meaningless numeric characters for the first four digits. Note that, when the user inputs only "F" into the position designation input field 35, this is treated as a request to set a fixed password, and in such a case a predetermined number of digits of numeric characters are inputted into a fixed password input field 37.

A conversion rule input field 36 is a field where, when the user references the presented pattern to actually input the password, if one wishes to give a further conversion rule for the element values derived from the password derivation pattern, this conversion rule is inputted here. That is, the element values derived from the password derivation pattern undergo the additional conversion rule, and the result thereof becomes the real password which should be inputted. In the conversion rule, for example, there is defined a 4-rule computational operation to be performed on the element values derived from the password derivation pattern. More specifically, when just "+1" is inputted into the conversion rule input field 36, "1" is added to each of the element values derived from the password derivation pattern, and the result thereof becomes the real password that the user should input. Furthermore, when commas are used, as when "+1, +2, +3, +4" is inputted into the conversion rule input field 36, thus inputting the computational formula so as to correspond to the sequence of elements inputted into the position designation input field 35, each computational formula is applied to each of the element values derived from the password derivation pattern, and the result thereof becomes the real password which the user should input.

Note that, depending on the inputted computational formula, the result produced by performing the computation to the element values may increase (or decrease). In such cases, if a definition is made to use the first position, then the number of digits (the number of characters) in the password can be a fixed set to a fixed length without fluctuating. Furthermore, it is also possible to set a definition so that the result produced by applying the computations to the element values is used just as it is, to enable a password of variable length.

In this type of registration screen, the user may use a keyboard to directly input the elements (element names) in sequence using commas to separate them, but a standard graphical user interface may also be used to make inputs in a similar fashion. When using the graphical interface, the user places a mouse cursor on the desired elements and selects (clicks) on them, at which time these elements are displayed in the position designation input field 35 separated by the delimiters. The selected elements, for example, are preferably displayed visually separated.

Note that, a candidate button 38 is for automatically generating the sequence of elements which should be selected. That is, when the user places the mouse cursor on and selects the candidate button 38, for example a sequence of pre-registered elements is randomly inputted into the position designation input field 35 and displayed. This is because in the case where the user sets the password derivation pattern, the user has a tendency to select neighboring buttons, and since these are easy to extrapolate, this sort of situation should be avoided, and so the candidate button 38 is provided in an auxiliary fashion.

After the user inputs the necessary information into the predetermined input fields, the user then selects a settings confirmation button 39, at which time a Web browser sends a registration request containing the inputted information to the verification server 12. The verification server 12, based on the received registration request, temporarily registers the user's password derivation pattern as the registration data, and displays a settings confirmation screen on the Web browser.

Figure 4:
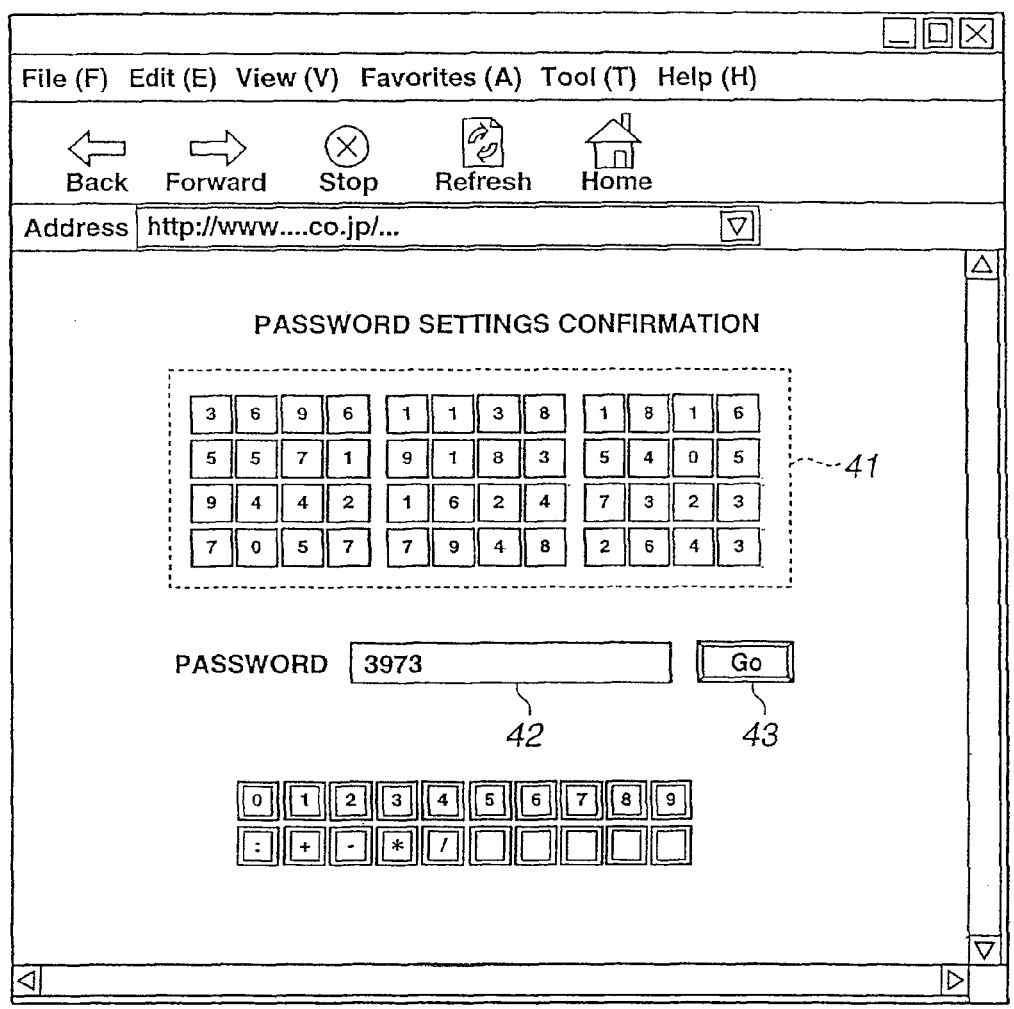
FIG. 4 is a diagram showing an example of a settings confirmation screen displayed on the personal computer in accordance with an embodiment of the present invention.

The settings confirmation screen is a screen for letting the user actually input the password in accordance with the password derivation pattern that was set by the user, so as to confirm the password derivation pattern. FIG. 4 shows an example of the settings confirmation screen displayed on the personal computer 15. However, instead of displaying on the personal computer 15, it is also possible to display the settings confirmation screen on the user's mobile phone 13, and have the user confirm the settings from the mobile phone 13. In this case, when the user wants to use the usage target system 11, it is also possible to confirm the mobile phone 13 used by the user.

As shown in FIG. 4, in the settings confirmation screen, there is presented a presented pattern 41, in which random numeric characters are plugged into each element group in the overall pattern 34 that was generated by the verification server 12. As the password, the user then inputs into a password input field 42, those numeric characters (element values) in the overall pattern 34 that have been plugged into the elements that correspond to the password derivation pattern which was set just previously. After the user inputs the password into the password input field 42, the user then selects a Go button 43, at which time the Web browser sends to the verification server 12 the verification request containing the inputted password. The verification server 12 then judges whether or not the password contained in the received confirmation request matches the numeric character string that was derived from the generated presented pattern and the password derivation pattern that was temporarily registered just previously, and when they do match, formally registers the user's password derivation pattern into the verification database 14 as the registration data.

Note that, when this password derivation pattern registration procedure is performed using the personal computer 15, in order to confirm the mobile phone 13 owned by the user, the verification server 12 preferably sends a predetermined message to the received mobile phone number, and the user's response to the message is requested.

Figure 5:
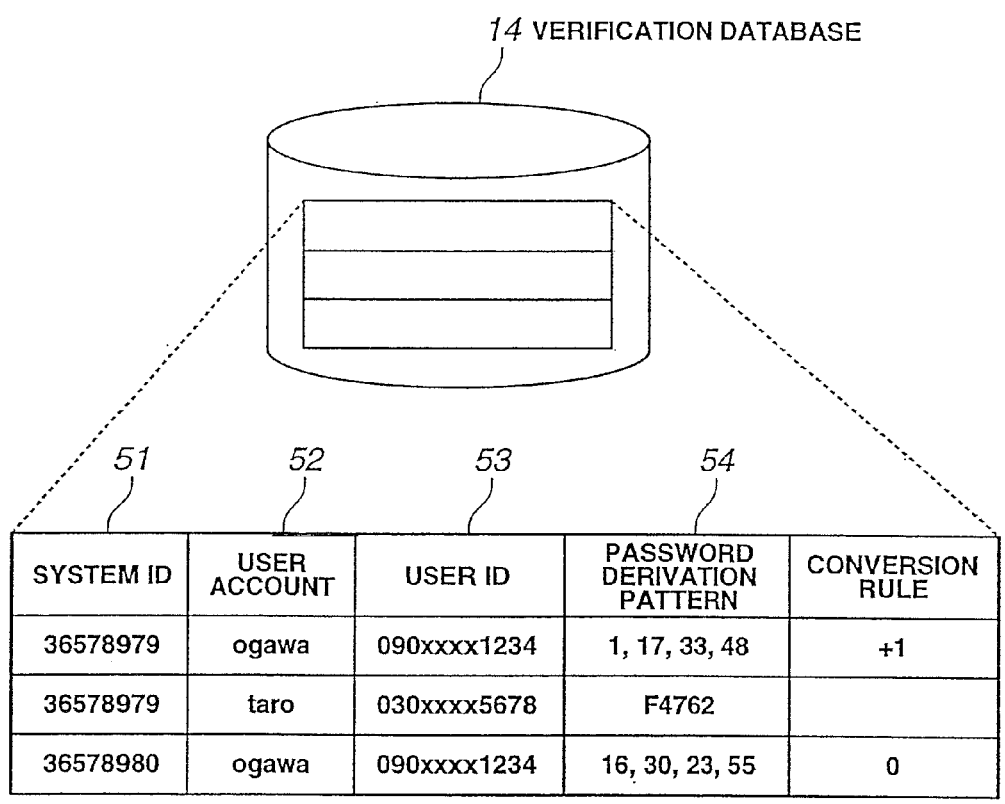
FIG. 5 is a diagram showing an example of a data structure of a verification database, in accordance with an embodiment of the present invention.

FIG. 5 is a diagram showing an example of data structures in the verification database 14. As shown in the diagram, one record in the verification database 14 is constituted by a system ID field 51, a user account field 52, a user ID field 53, a password derivation pattern field 54, and a conversion rule field 55. In the present example, a user "ogawa" is registered as a user who can use usage target systems 11 indicated by system IDs "36578979" and "3657980". Furthermore, the mobile phone 13 which the user "ogawa" uses for user verification is set as the mobile phone 13 indicated by a user ID "090xxxx1234". Furthermore, the password derivation pattern for the user "ogawa" which has been registered with the usage target system 11 indicated by the system ID "36578979" is set as "1, 17, 33, 48", and the conversion rule is set as "+1".

Figure 6:
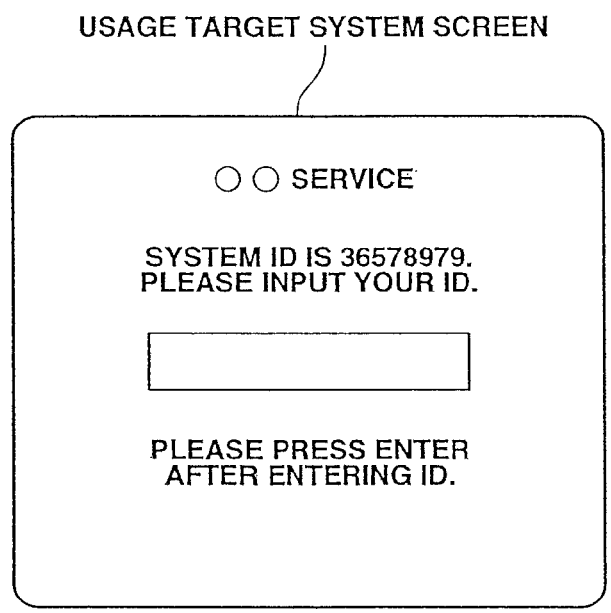
FIG. 6 is a diagram showing an example of a reception screen displayed on a usage target system, in accordance with an embodiment of the present invention.

Next, detailed explanation is given regarding processing flow of a user verification method for when the user tries to use the usage target system 11. When the user actually tries to use the usage target system 11, in order to obtain the system ID, the user operates the user interface of the usage target system 11 to display the system ID. For example, when the user interface of the usage target system 11 is provided with a "start usage" button, when the user operates the "start usage" button, the usage target system 11 displays a reception screen such as shown in FIG. 6 in the user interface, and displays the system ID to the user and urges the user to input the user ID.

Figure 7:
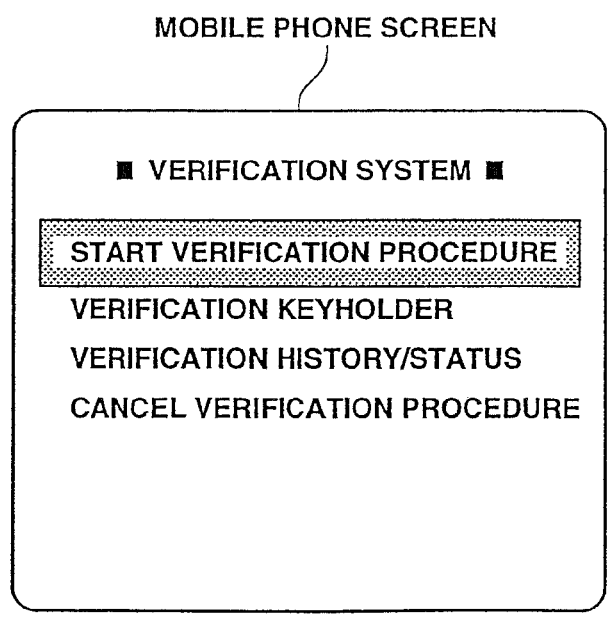
FIG. 7 is a diagram showing an example of a menu screen displayed on a mobile phone, in accordance with an embodiment of the present invention.
Figure 8:
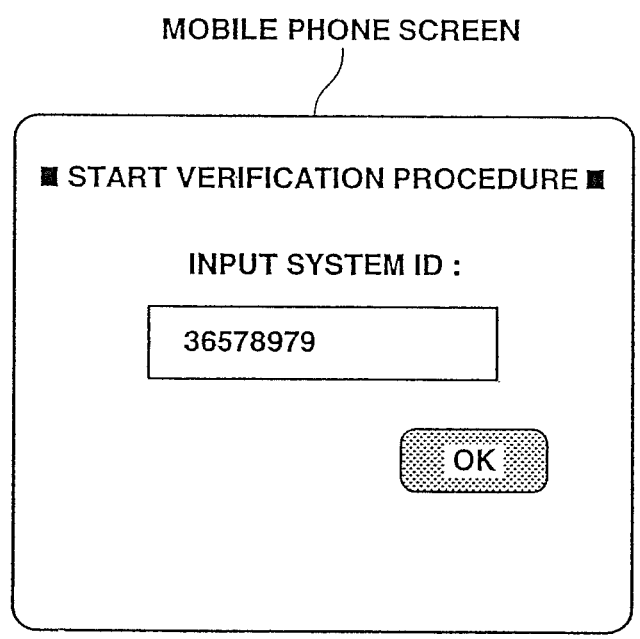
FIG. 8 is a diagram showing an example of a verification procedure start screen displayed on the mobile phone, in accordance with an embodiment of the present invention.

The user operates the mobile phone 13, designates a URL that has been registered as a so-called bookmark, access the verification server 12, displays a menu screen such as shown in FIG. 7, and then selects to start the verification procedure, and displays a verification procedure start screen such as shown in FIG. 8. The user inputs a system ID into the verification procedure start screen, and selects the "OK" button. Note that, a construction may be used in which, when a fixed system ID is used, as in the present embodiment, the inputted system ID is can be registered in the mobile phone 13.

Accordingly, the mobile phone 13 sends a verification procedure start message containing the system ID as a parameter to the verification server 12. At this time, the mobile phone 13 then sends to the verification server 12 the user ID, which is one example of user identification information for identifying the user. The user ID may be information for identifying the user him- or herself, or may be information that identifies for example, the mobile phone or the like which the user owns or uses. In the present embodiment, the mobile phone 13 sends the mobile phone number, which is an example of the information for identifying the mobile phone 13, to verification server 12 as the user ID. The user ID may be included in the verification procedure start message as a parameter, or may be sent at the system level.

Figure 9:
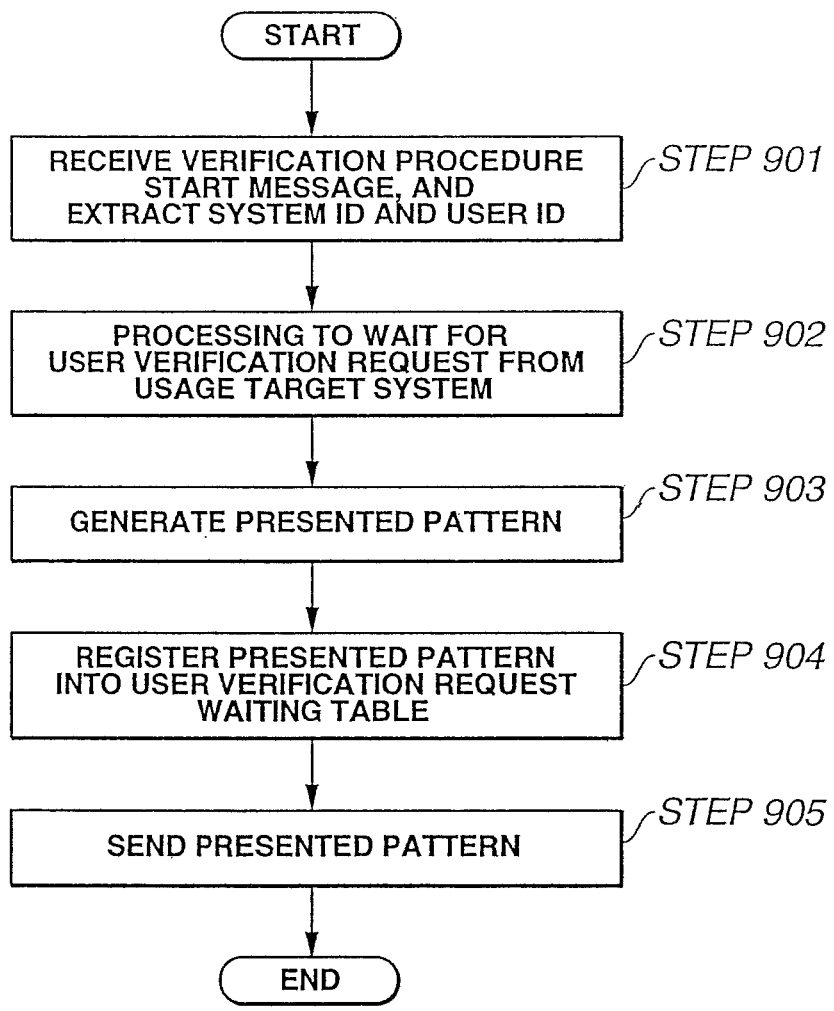
FIG. 9 is a flowchart for explaining processing flow in a verification server, in accordance with an embodiment of the present invention.
Figure 14:
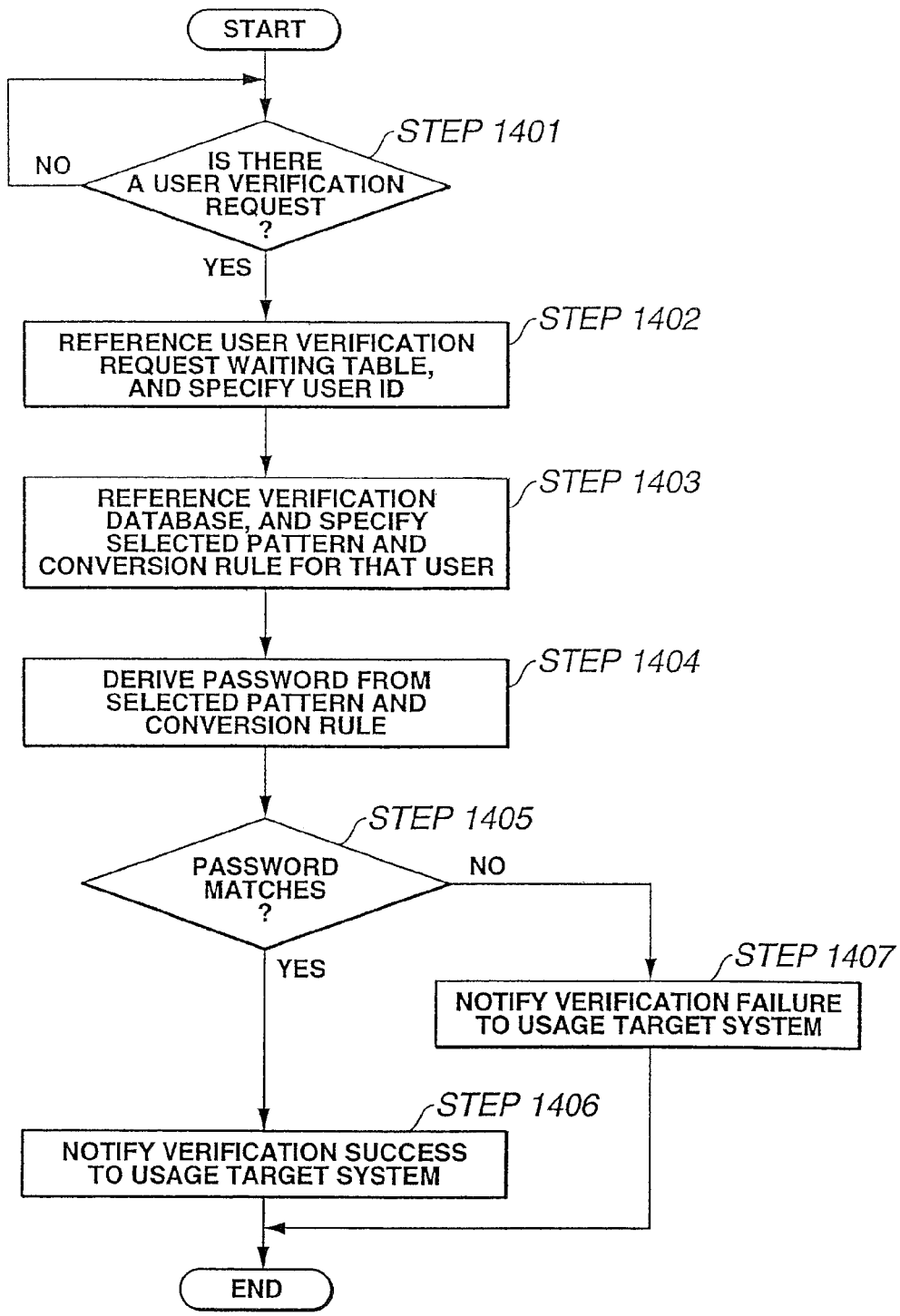
FIG. 14 is a flowchart for explaining processing flow in the verification server in accordance with an embodiment of the present invention.

FIG. 9 and FIG. 14 are flowcharts for explaining processing flow at the verification server 12 in accordance with the present embodiment. In the following flowcharts, the processing flows are explained sequentially, but such is not necessary. Therefore, provided no inconsistencies are generated in processing operations or effects, the processing sequences may be switched around or performed in parallel.

Figure 10:
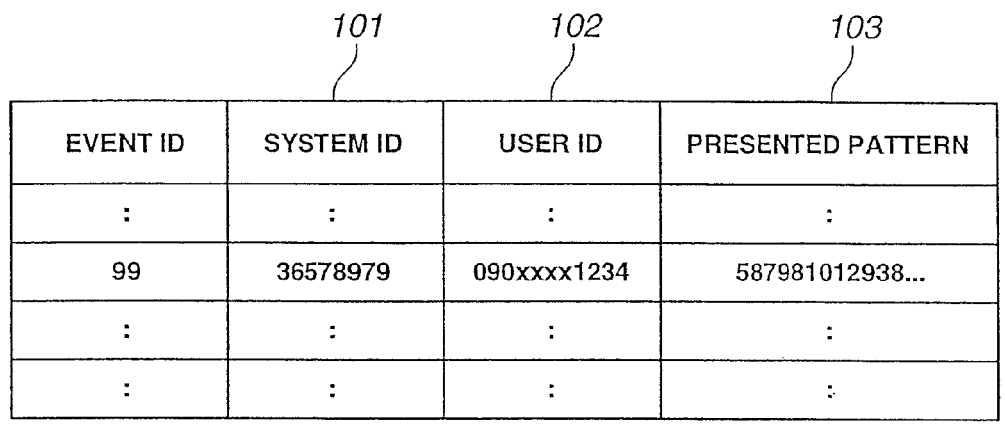
FIG. 10 is a diagram for explaining an example of a user verification request waiting table in accordance with an embodiment of the present invention.

As shown in FIG. 9, the verification server 12 receives the verification procedure start message sent by the mobile phone 13, and then extracts the system ID and the user ID therefrom (STEP 901). Next, since the verification server 12 is waiting for the user verification request from the usage target system 11 indicated by the extracted system ID, the verification server 12 issues an event ID, registers the extracted system ID and the user ID into a user verification request waiting table such as shown in FIG. 10, and loads a process for executing processing shown in FIG. 14 (STEP 902). The user verification request waiting table is registered in the verification database 14, for example.

Figure 11:
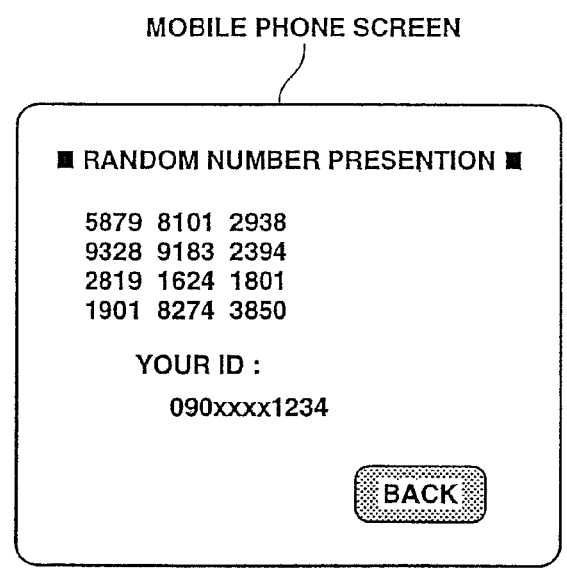
FIG. 11 is a diagram showing an example of a random number table display screen, which is displayed on the mobile phone, in accordance with an embodiment of the present invention.

Next, the verification server 12 calls up a predetermined random number generating function, which issues random numeric characters to generate the presented pattern (STEP 903). Considering the security risks, the presented pattern is preferably a random number table whose element values change each time the user verification is performed, but a presented pattern with fixed element values may be used as well, and thus is not intended to be excluded. When the verification server 12 generates the presented pattern, the presented pattern is registered into the above-mentioned user verification request waiting table (STEP 904), and is sent together with the user ID to the mobile phone 13 (STEP 905). Accordingly, the mobile phone 13 displays a random number table display screen such as shown in FIG. 11.

Figure 12:
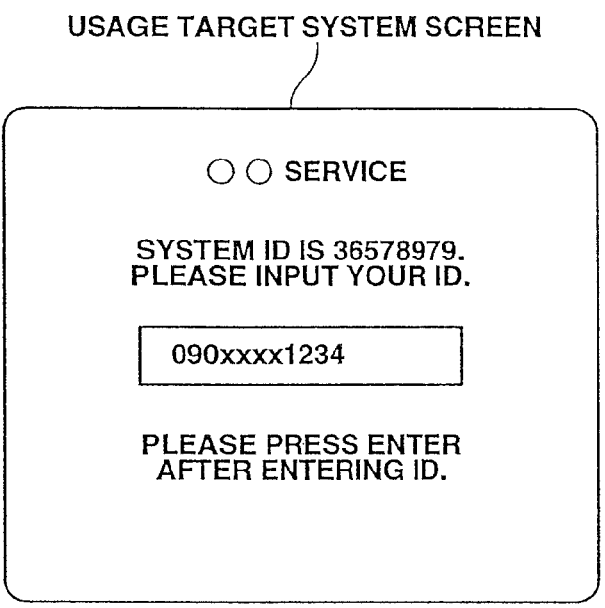
FIG. 12 is a diagram showing an example of a reception screen displayed on the usage target system in accordance with an embodiment of the present invention.
Figure 13:
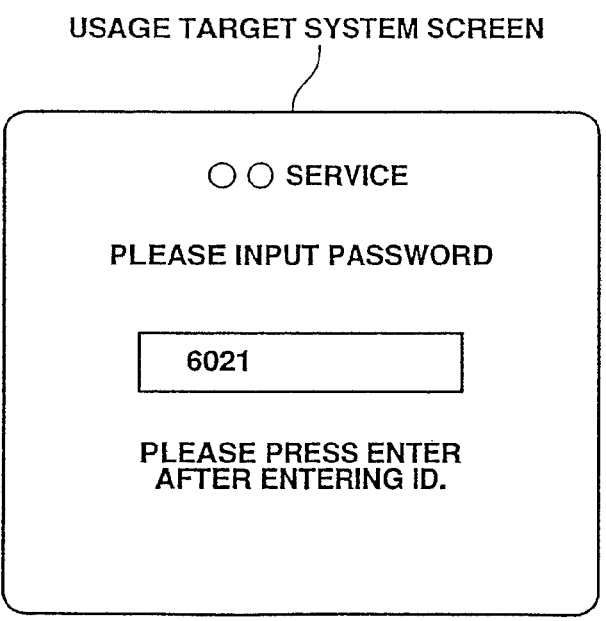
FIG. 13 is a diagram showing an example of a password input screen displayed on the usage target system in accordance with an embodiment of the present invention.

The user, when the random number table display screen is displayed on the mobile phone 13, inputs the user ID into the reception screen of the usage target system 11 shown in FIG. 6. FIG. 12 shows the reception screen in the state where the user ID has been inputted. When the user presses the Enter key, the usage target system 11 displays the password input screen such as shown in FIG. 13. In response to this, the user inputs the password derived from the password derivation pattern that has already been registered. For example, the user's password derivation pattern may be the password derivation pattern that was registered in the password derivation pattern registration screen shown in FIG. 3. In such a case, according to the random number table display screen shown in FIG. 11, "5910" is derived, and then this further undergoes application of the conversion rule "+1", whereby deriving the password "6021". The user then inputs the password that is thus derived, and then presses the enter key, at which time the usage target system 11 sends the password that was inputted (hereinafter, referred to as the "inputted password") together with its own system ID to the verification server 12 as the user verification request.

The password that is sent from the usage target system 11 is used in user verification by the verification server 12, in accordance with the flowchart shown in FIG. 14. That is, when the verification server 12 that is waiting for the user verification request receives the user verification request from the usage target system 11 (Yes at STEP 1401), the verification server 12 references the user verification request waiting table shown in FIG. 10, and specifies the user ID (STEP 1402). Since registration into the user verification request waiting table requires the verification procedure start message from the mobile phone 13, the user verification request from an unregistered usage target system 11 can be excluded as illegitimate. When the verification server 12 identifies the user ID, the verification server 12 references the verification database 14, and identifies the password derivation pattern and conversion rule for that user ID (STEP 1403). Subsequently, the verification server 12, based on the identified password derivation pattern and conversion rule, derives the password (hereinafter, referred to as the "system internal password"), from the presented pattern registered in the user verification request waiting table (STEP 1404). Specifically, for the element group constituting the presented pattern, the verification server 12 obtains the element values corresponding to the sequence of elements constituting the password derivation pattern, and furthermore, if the conversion rule has been defined, applies the conversion rule on the element values, and thus derives the system internal password. Next, the verification server 12 judges whether or not the inputted password that was sent and the system internal password match each other (STEP 1405). Then, when it is judged that these do match each other, the verification server 12 notifies verification success to the usage target system 11 indicated by the system ID (STEP 1406). On the other hand, if they do not match, the verification server 12 notifies verification failure (STEP 1407). The usage target system 11 performs processing accordingly based on the verification result notified from the verification server 12.

As described above, the present embodiment provides the following benefits. Namely, the password which should be inputted when the user is going to use the usage target system 11, is temporarily determined from the presented pattern that is generated randomly each time the user verification is performed, in accordance with the password derivation pattern which is registered in advance. Therefore, even if the password inputted by the user leaks to a third party, the password itself is entirely meaningless the next time the user verification is performed, and thus illegitimate access can be prevented effectively. In this case, since the user remembers not "specific numeric characters" as in the conventional technique, but rather the "conceptual, diagrammatic" password derivation pattern instead as the "password", the password is easy to remember and difficult to forget, thus making password management easy.

Furthermore, since the user can give the conversion rule for this password derivation pattern, higher level security can be pursued.

Furthermore, the verification server 12 receives the verification procedure start message from the user's mobile phone 13, and thereby receives the user verification request from the usage target system 11 designated therein, and thereby can prevent illegitimate access from the usage target system 11 unit.

Note that, the present embodiment is constructed such that the usage target system 11 displays the reception screen (FIG. 6) on the user interface and urges the user to input the user ID, but this construction is not particularly necessary. For example, a construction is also possible in which the usage target system 11 obtains information of a list of users able to use the verification server 12, and then displays this to the user as a pull-down menu, and urges input.

Furthermore, in the present embodiment, the system ID is a system ID that is unique to the usage target system 11 (a unique system ID), but the system ID may also be a shared system ID that is common to a plurality of usage target system 11. That is, a plurality of usage target systems 11 may have the same system ID. Accordingly, the usage target system 11, instead of registering the unique system ID of a given usage target system 11 into the verification database 14 which is described below, can use the shared ID to make the verification request to the verification server 12, so that the user verification system can be used easily.

In the case where the usage target system 11 uses the shared system ID make the verification request, the verification server 12 may also provide to that usage target system 11 a different service from the service provided to the usage target system 11 having the unique system ID. Thus, the verification server 12 can send the user's personal information to the usage target system 11 that used the unique system ID to make the verification request, while not sending the user's personal information to the usage target system 11 that used the shared system ID to make the verification request, or in other similar ways can establish differences between the services provided to the usage target system 11 using the unique system ID and the usage target system 11 using the shared system ID.

Second Embodiment

The present embodiment is a variation of the first embodiment. Instead of the usage target system 11, the password is inputted from the mobile phone 13. Furthermore, in the present embodiment, instead of the fixed system ID, explanation is also given regarding an example that uses a usage ID which is generated anew each time the usage target system 11 is used.

Figure 15:
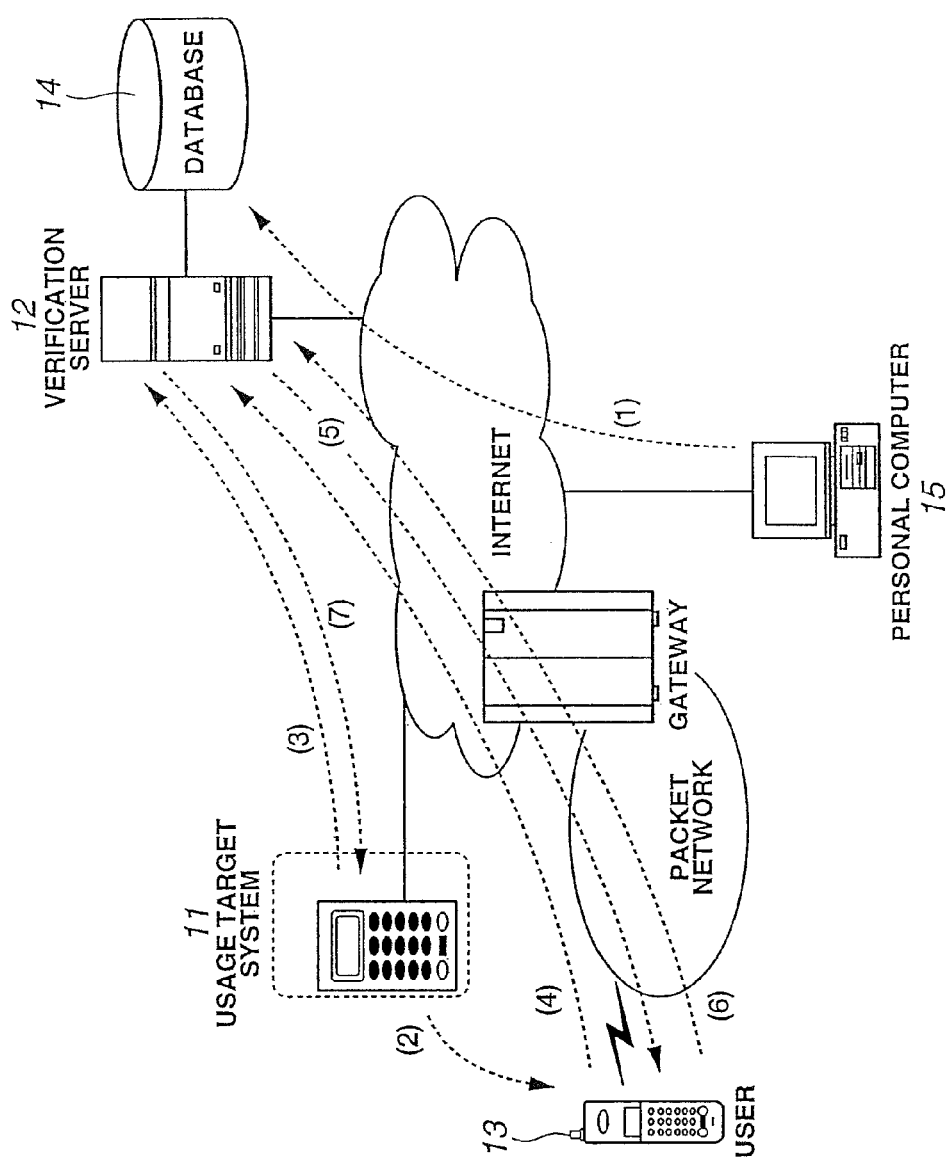
FIG. 15 is a summary diagram for explaining an overall scheme of a user verification method in accordance with an embodiment of the present invention.

FIG. 15 is a summary diagram for explaining an overall system of the user verification method in accordance with the present embodiment.

First, the user uses the personal computer 15 to pre-register his or her own password derivation pattern or the usage target system 11 into the verification database 14 ((1) in the diagram). When the user tries to actually use the usage target system 11, in order to obtain the user ID, the user operates the user interface of the usage target system 11 to display the usage ID ((2) in the diagram).

The usage target system 11, for example, obtains information of the time when operations were performed, gives a random number generation function for this, randomly generates the usage ID, and displays the ID. At this time, the usage target system 11 sends the generated usage ID together with its own system ID to the verification server 12 ((3) in the diagram).

Next, the user inputs the usage ID into the mobile phone 13 and sends to the verification server 12 ((4) in the diagram). The verification server 12 receives the usage ID, and then specifies the usage target system 11 and also generates a random number table, which is then sent as the presented pattern to the user's mobile phone 13 ((5) diagram). The user references the presented pattern that is presented on the mobile phone 13, and inputs the sequence of element values (the numeric character string) plugged into the user's own password derivation pattern. Thus, the password is sent from the mobile phone 13 to the verification server 12 ((6) in the diagram).

The verification server 12 receives this transmission and then compares the numeric character string obtained from the user's password derivation pattern that was registered and the generated presented pattern, and the numeric character string that was sent from the mobile phone 13, and judges whether or not these numeric character strings match each other. The verification server 12 then notifies verification success if they are judged as matching, or notifies verification failure if not, to the usage target system 11 that was specified ((7) in the diagram). The usage target system 11 gives access approval for the user when the notification for verification success is received from the verification server 12.

As described above, the present embodiment provides benefits similar to those of the first embodiment, and also provides the following benefits. That is, since there is no need to input the password from the usage target system 11, the user interface of the usage target system 11 can be made in a simple construction. Furthermore, since the new usage ID is made each time the usage target system 11 is used, even when the usage ID is leaked there is no problem whatsoever, thus enabling pursuit of a higher level of security.

Third Embodiment

The present embodiment relates to a password derivation pattern registration method using the mobile phone 13, where the verification server 12 presents a password derivation pattern candidate on the mobile phone 13, and the user makes a selection from the presented password derivation pattern candidates.

FIG. 16 shows an example of a password derivation pattern registration screen displayed on the mobile phone 13. Similarly to the above-mentioned embodiments, for example at the time when the user account for the usage target system 11 is registered, the verification server 12 uses an email to send mail content containing a URL of page data constituting this registration screen to the user's mobile phone 13. The user, having received this transmission, selects the URL in the mail content displayed on the mobile phone 13, whereby the registration screen is provided to the user's mobile phone 13.

Figure 16A:
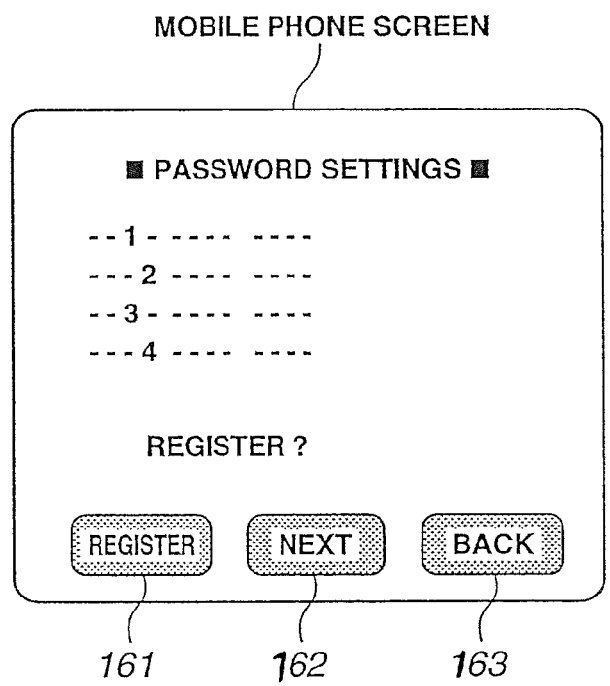
FIGS. 16A and 16B are diagrams showing examples of a password derivation pattern registration screen displayed on a mobile phone in accordance with an embodiment of the present invention.
Figure 16B:
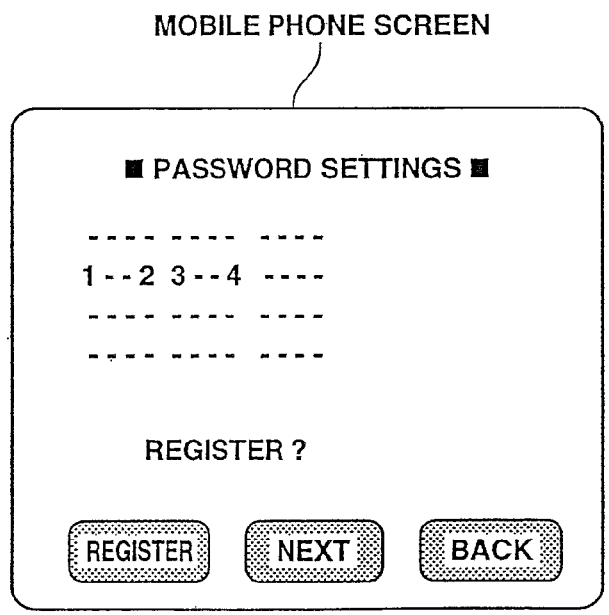

That is, when the verification server 12 receives a password derivation pattern registration request from the user's mobile phone 13, the verification server 12 then selects one password derivation pattern as the registration candidate from among a group of password derivation patterns that have been pre-registered, and then sends this to the mobile phone 13. Accordingly, the registration screen containing the password derivation pattern candidate, such as shown in FIG. 16A, is presented on the user's mobile phone 13. When the user wishes to register the password derivation pattern candidate shown in the registration screen as his or her own password derivation pattern, the user then selects a "Register" button 161. On the other hand, when the user wishes to view another password derivation pattern candidate, the user selects a "Next" button 162. When the user selects the "Next" button 162, the verification server 12 sends another candidate to the mobile phone 13, and another registration screen containing the other password derivation pattern, such as shown in FIG. 16B, is presented on the mobile phone 13. If there is a previous password derivation pattern candidate, when the user wishes to view this the user selects a "Back" button 163.

Figure 17:
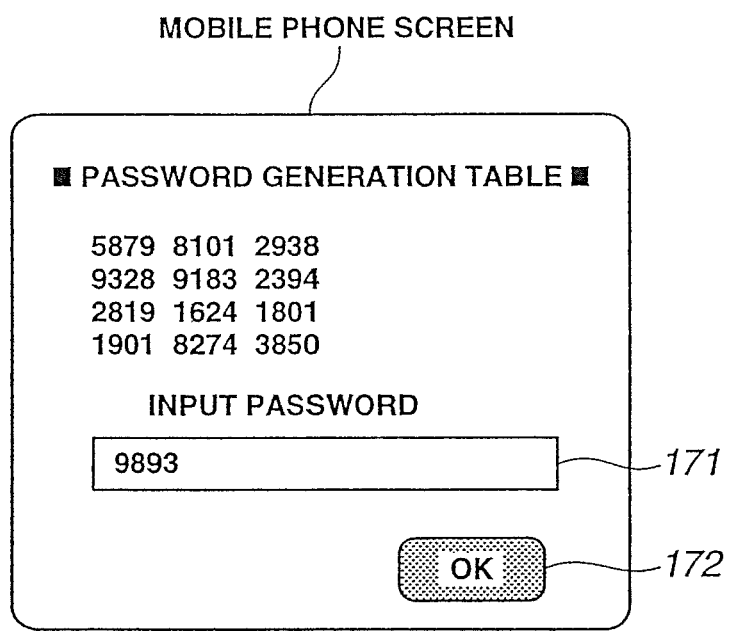
FIG. 17 is a diagram showing an example of a settings confirmation screen displayed on a mobile phone, in accordance with an embodiment of the present invention.

For example, in the registration screen shown in FIG. 16B, when the user selects the "Register" button 161, the mobile phone 13 sends the registration request to the verification server 12. The verification server 12, based on the received registration request, temporarily registers the user's password derivation pattern into the verification database 14 as the registration data, and sends the settings confirmation screen to the mobile phone 13. FIG. 17 is a diagram showing an example of the settings confirmation screen at this time. In a password input field 171 in the settings confirmation screen, the user then inputs the numeric characters (element values) that have been assigned to the elements corresponding to the password derivation pattern that was set, and then selects an "OK" button 172. By doing so, the mobile phone 13 then sends a confirmation request containing the inputted password to the verification server 12. The verification server 12 then judges whether or not the password contained in the received confirmation request matches the numeric character string that is derived from the generated presented pattern and the password derivation pattern that has been temporarily registered. When the password does match, the user's password derivation pattern is formally registered in the verification database 14 as the registration data, and an indication that registration is complete is sent to the mobile phone 13.

As described above, in accordance with the present embodiment, since the desired password derivation pattern is selected from the password derivation pattern candidates presented from the verification server 12, even when the user interface is insufficient as when using the mobile phone 13, the password derivation pattern can be registered extremely easily. Furthermore, by the verification server 12 displaying the password derivation pattern, it becomes possible to avoid the situation where the user registers as his or her password derivation pattern a password derivation pattern that can be extrapolated easily, as when adjacent elements are selected.

Fourth Embodiment

The present embodiment relates to a password derivation pattern registration method using the mobile phone 13, where inputs of the element values corresponding to the password derivation pattern intended by the user are repeated, whereby the password derivation pattern gets specified.

Figure 18:
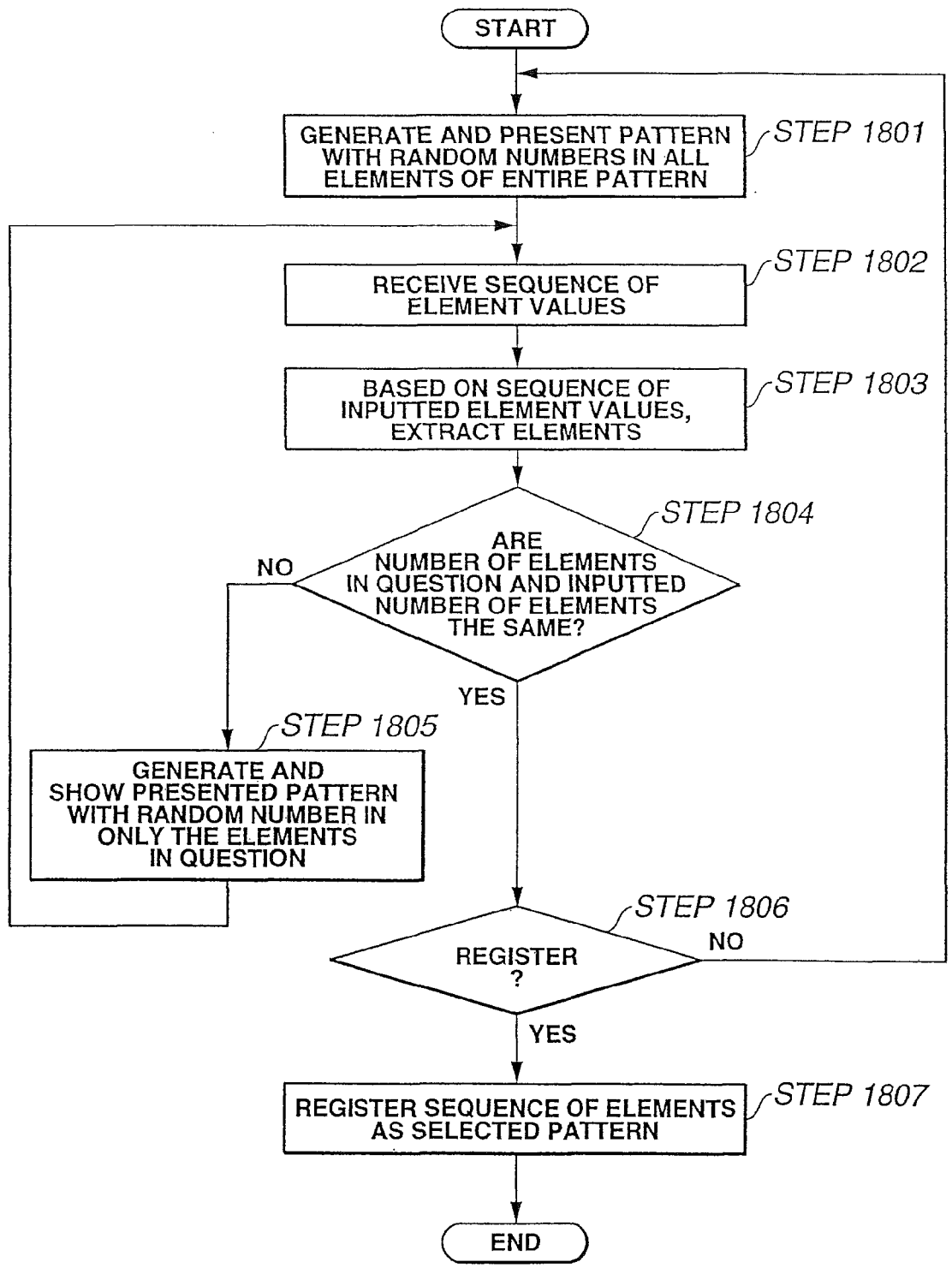
FIG. 18 is a flowchart for explaining processing flow of a password derivation pattern registration method in accordance with an embodiment of the present invention.

FIG. 18 is a flowchart for explaining processing flow of the password derivation pattern registration method in accordance with the present embodiment. This processing is achieved by corresponding programs in a client/server model using the mobile phone 13 and the verification server 12. In the present embodiment, page data containing a specific program for achieving this type of processing is sent from the verification server 12 to the mobile phone 13, and this program is executed on the mobile phone 13 to achieve the invention.

Similarly to the above-mentioned embodiments, for example at the point in time where the user account for the usage target system 11 is registered, the verification server 12 uses email to send mail content containing a URL of page data constituting the registration screen to the user's mobile phone 13. The user, having received this transmission, selects the URL from the mail content displayed on the mobile phone 13. Accordingly, the verification server 12 sends page data containing the predetermined program to the mobile phone 13.

The mobile phone 13, having received the page data, interprets the page data, executes processing shown in FIG. 18 in accordance with the predetermined program contained there, and displays the registration screen. That is, the mobile phone 13, first, for the entire pattern 34 element group, assigns random numbers generated using the random number generation function to generate the presented pattern, and displays this as a password derivation pattern combined with other screen elements, and urges the user to make an input (STEP 1801). In the registration screen, the user inputs numeric characters assigned to the elements in the password derivation pattern which the user is trying to register. When the mobile phone 13 receives the element sequence from the user (STEP 1802), the elements having the inputted element values are extracted from the presented pattern as the element values, and the quantity thereof is held (STEP 1803). Next, the mobile phone 13 judges whether or not the number of the extracted elements and the number of the inputted elements are the same (STEP 1804). If it is judged that they are not the same, in order to narrow down the elements, the random numbers are assigned only to the extracted elements in the overall pattern 34 to generate the presented pattern is generated, and, similarly, this presented pattern is presented as the registration screen and the user is urged to make an input (STEP 1805). On the other hand when it is judged that the number of the extracted elements and the number of the inputted elements are the same, it is considered that the elements have been narrowed down, so the mobile phone displays a registration confirmation screen, and urges the user to confirm (STEP 1806). Then, when the user presses an "OK" button, for example (Yes at STEP 1806), the mobile phone 13, in order to register the element sequence as the password derivation pattern, sends a registration request to the verification server 12 (STEP 1806), thus the processing ends.

In this way, by repeating the input of the element values corresponding to the password derivation pattern which the user wishes to register, the elements of the presented pattern get narrowed down, and the password derivation pattern intended by the user gets specified.

Figure 19A:
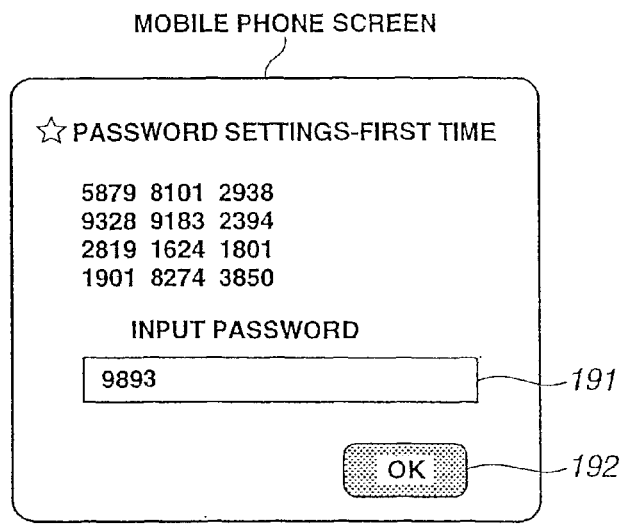
FIGS. 19A, 19B, and 19C are examples of a screen for explaining the password derivation pattern registration method in accordance with an embodiment of the present invention.
Figure 19B:
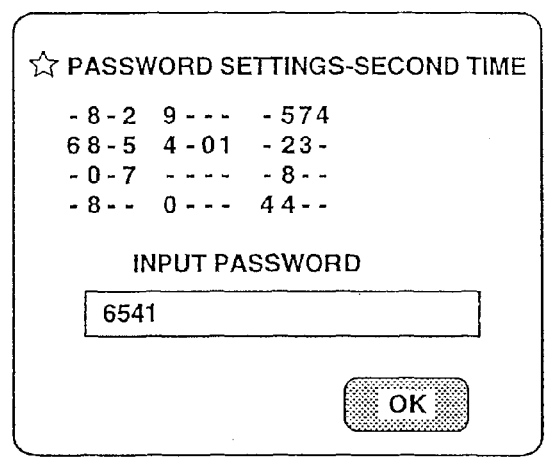
Figure 19C:
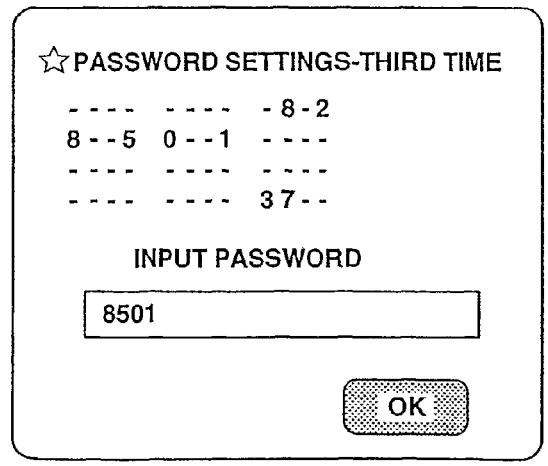
Figure 20:
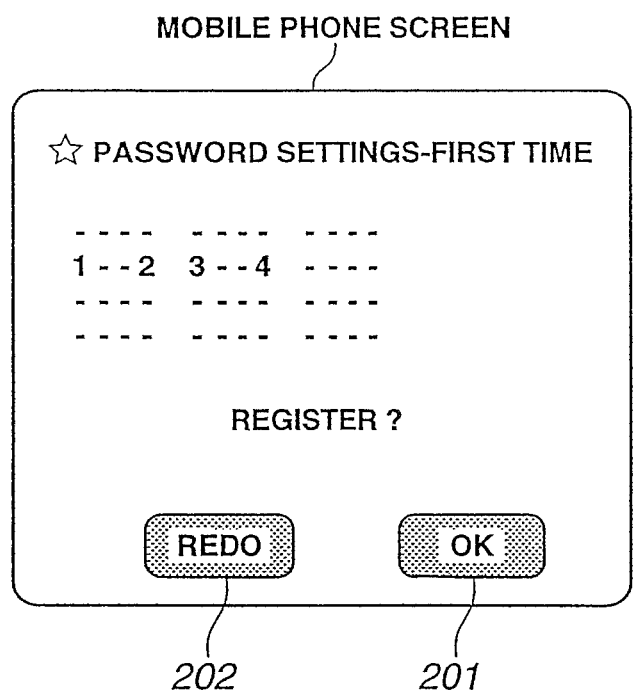
FIG. 20 is another example of a screen for explaining the password derivation pattern registration method, in accordance with an embodiment of the present invention.

FIG. 19 and FIG. 20, are examples of screens for explaining the password derivation pattern registration method. First, it is assumed that the screen shown in FIG. 19A is displayed on the mobile phone 13. Here, when the user inputs "9893" into the screen, the mobile phone 13 generates a new presented pattern based on the sequence of inputted elements. That is, the mobile phone 13 extracts the elements whose values were "9", "8" or "3" from the elements in the previous presented pattern as the given elements. However, in this case, the number of the given extracted elements has not been narrowed down as far as the number of inputted elements, so the mobile phone 13 generates the new presented pattern with the random numbers assigned to the extracted elements, and displays a registration screen such as shown in FIG. 19B.

In this screen, the user re-inputs the numeric characters assigned to the elements in the password derivation pattern which the user is trying to register, and thus carries out the task of narrowing down the given extracted elements. In this case, the numeric characters which the user should input are "6541". If the given extracted elements cannot be narrowed down, then the mobile phone 13 generates a new password derivation pattern, and then displays a registration screen such as shown in FIG. 19C and urges the user to make an input. Here, in this screen, the user inputs the numeric characters "8501" which have been assigned to the elements in the password derivation pattern which the user is trying to register.

Since these inputs narrow down the extracted elements, the mobile phone 13 displays a registration confirmation screen such as shown in FIG. 20, and urges the user to confirm (STEP 1806). When the user selects an "OK" button 201 in this screen, the mobile phone 13 sends the element sequence to the verification server 12 as the password derivation pattern. On the other hand, when the user selects a "Redo" button 202, the mobile phone 13 redoes the password derivation pattern registration processing from the beginning.

As described above, in accordance with the present embodiment, the presenting of the presented pattern and the inputting of the element values corresponding to the password derivation pattern which the user is trying to register, are repeated to narrow down the elements of the presented pattern. As such, the password derivation pattern intended by the user can get specified. Therefore, even in the case where the user interface is insufficient, as in the case of the mobile phone 13, the password derivation pattern can be registered extremely easily.

Furthermore, in the present embodiment, the operations for registering the password derivation pattern are performed in the same sequence as the actual password input operations, so the user can also practice inputting, and can quickly learn the password derivation pattern without fail.

Note that, in the present invention, the presented pattern is generated randomly to narrow down the elements intended by the user. As such, depending on the combination of presented patterns that are generated, there are cases where the narrowing down task is required three times or more. In order to avoid such a situation, it is also possible to use a fixed presented pattern combination by which the narrowing down task will definitely end in two times.

Fifth Embodiment

In the present embodiment, instead of the fixed user ID for the user verification, temporary identification information for temporarily identifying the user is generated.

Figure 21:
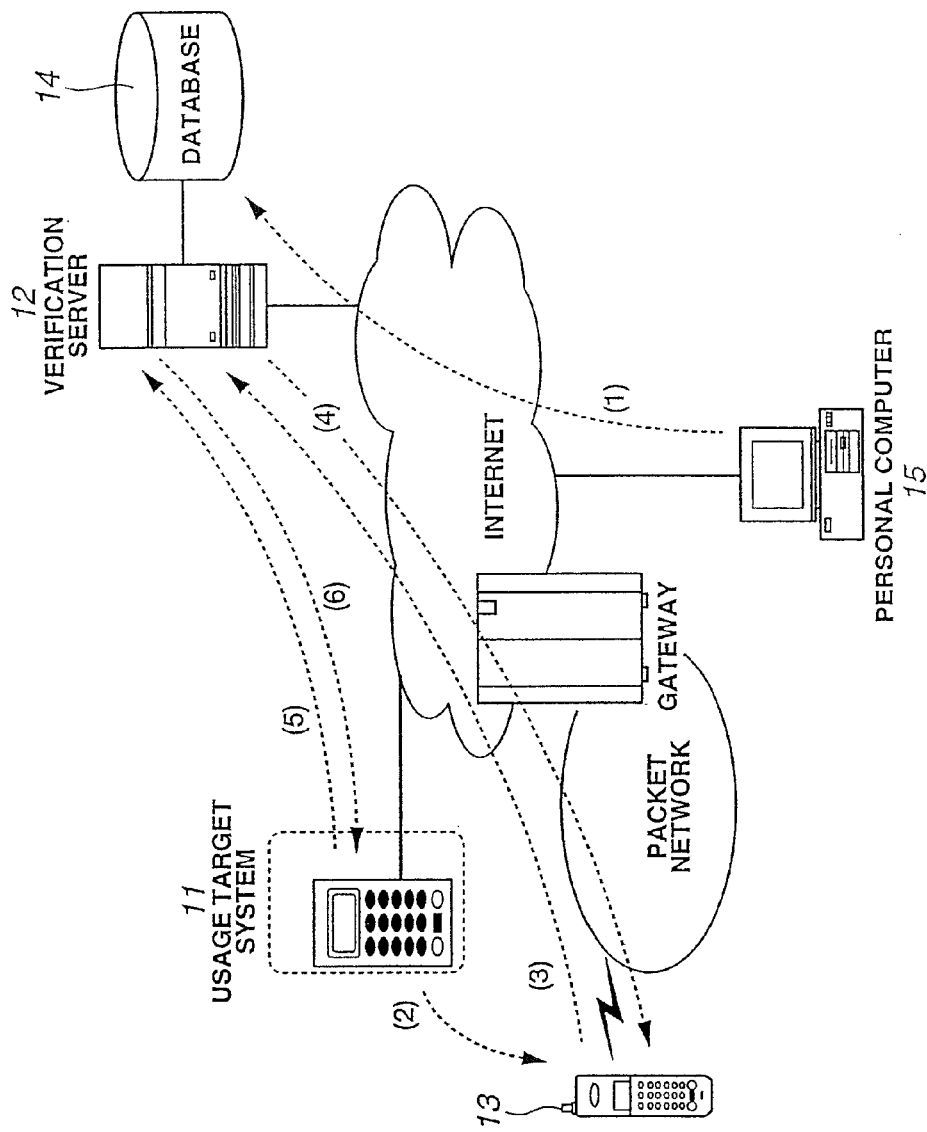
FIG. 21 is a summary diagram for explaining an overall scheme of a user verification method in accordance with an embodiment of the present invention.

FIG. 21 is a summary diagram for explaining an overall scheme of a user verification method in accordance with the present embodiment. First, the user uses the personal computer 15 to pre-register his or her own password derivation pattern for the usage target system 11 into the verification database 14 ((1) in the diagram). When the user is actually going to use the usage target system 11, in order to obtain the system ID the user operates the user interface of the usage target system 11 to display the system ID ((2) in the diagram).

Next, the user inputs the system ID into the mobile phone 13, and sends to the verification server 12 ((3) in the diagram. The verification server 12 receives the transmission, generates the random number table (which, in the present embodiment, is random number information in a 4-row-by-4-column or 4-row-by-12-column matrix form), and sends this table as the presented pattern to the user's mobile phone 13, and also generates temporary information which is for temporarily identifying the user and is associated with the user ID, and sends this information to the user's mobile phone 13 ((4) in the diagram). The user references the temporary information and the presented pattern which are presented on the mobile phone 13, and inputs into the usage target system 11 both the temporary information and, as the password, the element sequence (numeric character string) which has been assigned to the user's own password derivation pattern. Accordingly, the usage target system 11 sends the temporary information and the password to the verification server 12 ((5) in the diagram).

The verification server 12 receives the temporary information and the password from the usage target system 11, and then identifies the user from the temporary information, and then compares the numeric character string obtained from the user's password derivation pattern which has already been registered and the generated presented pattern, and the password that was sent from the usage target system 11, to judge whether these match each other. The verification server 12 then notifies verification success and per-system user identification information described below when they are judged as matching, and notifies verification failure when they are judged as not matching, to the usage target system 11 indicated by the system ID ((6) in the diagram). The usage target system 11 gives approval for usage of that usage target system 11 to that user when the notification of verification success from the verification server 12 is received.

FIG. 22 is a diagram showing an example of data structures in the verification database 14. As shown in FIG. 22, one record in the verification database 14 includes a system ID field 51, a user account field 52, a user ID field 53, a password derivation pattern field 54, a temporary identification information field 56, and a per-system user identification information field 57. In the present example, a user "ogawa" is registered as a user who can use usage target systems 11 indicated by system IDs "36578979", "3657980" and "36578981". Furthermore, the mobile phone 13 which the user "ogawa" uses for user verification is set as the mobile phone 13 indicated by a user ID "090xxxx1234". Furthermore, the password derivation pattern for the user "ogawa" which has been registered with the usage target system 11 indicated by the system ID "36578979" is set as "1, 17, 33, 48".

FIG. 23 is a diagram showing an example of a user verification request waiting table (cf. first embodiment). In the present embodiment, the user verification request waiting table includes an event ID field 100, a system ID field 101, a user ID field 102, a presented pattern field 103, and a temporary identification information field 104.

Figure 24:
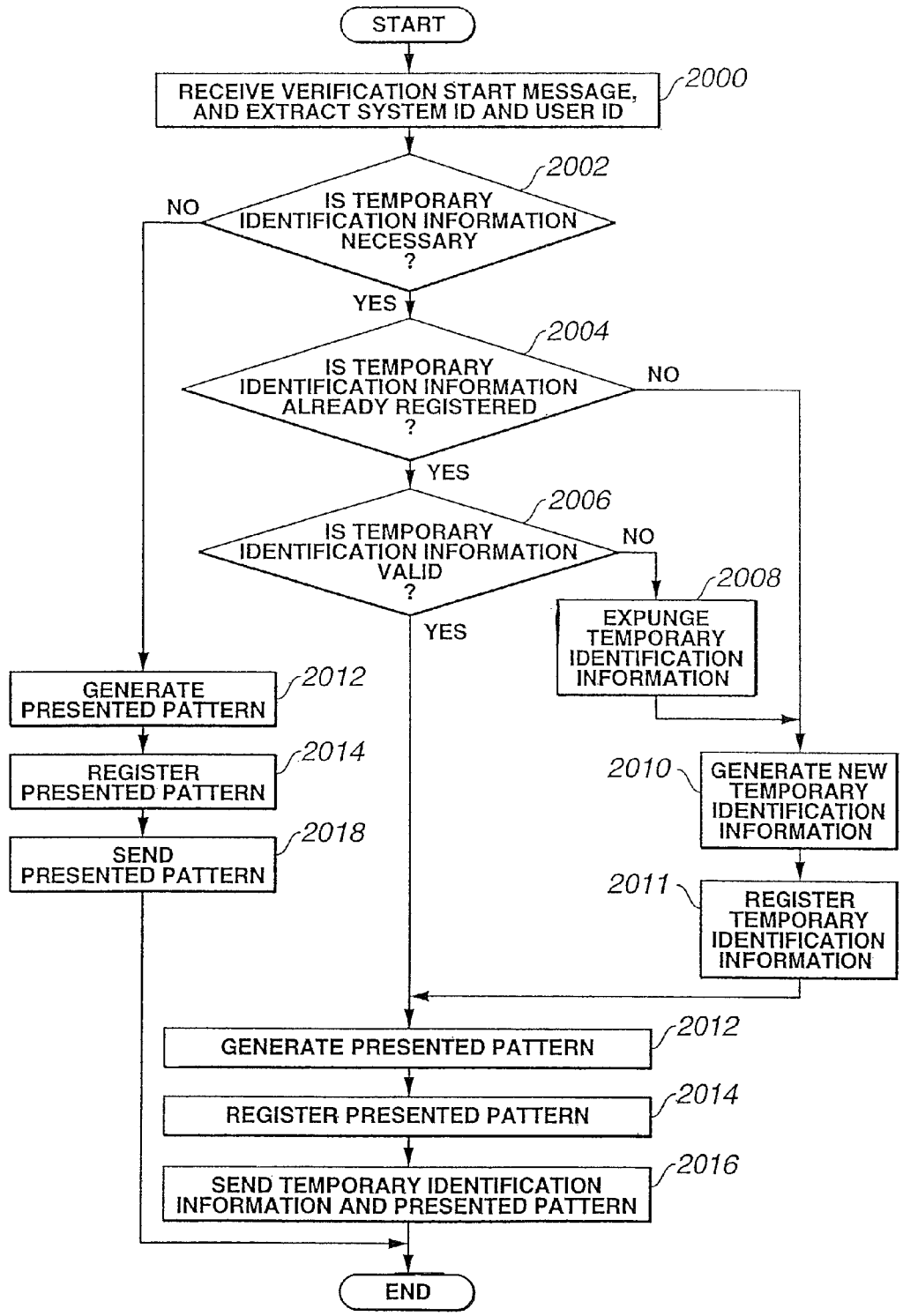
FIG. 24 is a flowchart for explaining processing flow on a verification server 12, in accordance with the present embodiment.
Figure 25:
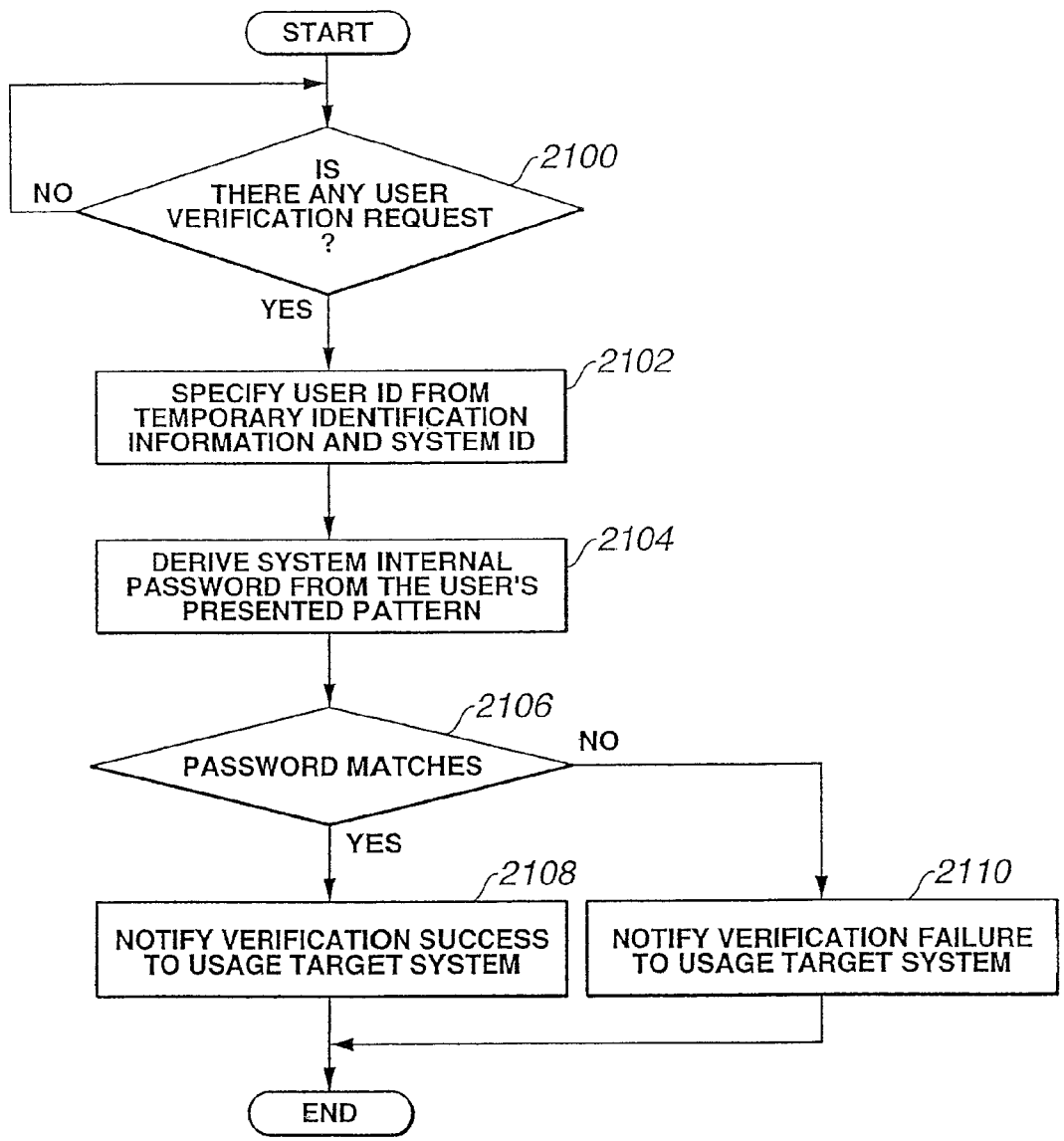
FIG. 25 is a flowchart for explaining processing flow on the verification server 12, in accordance with the present embodiment.
Figure 26:
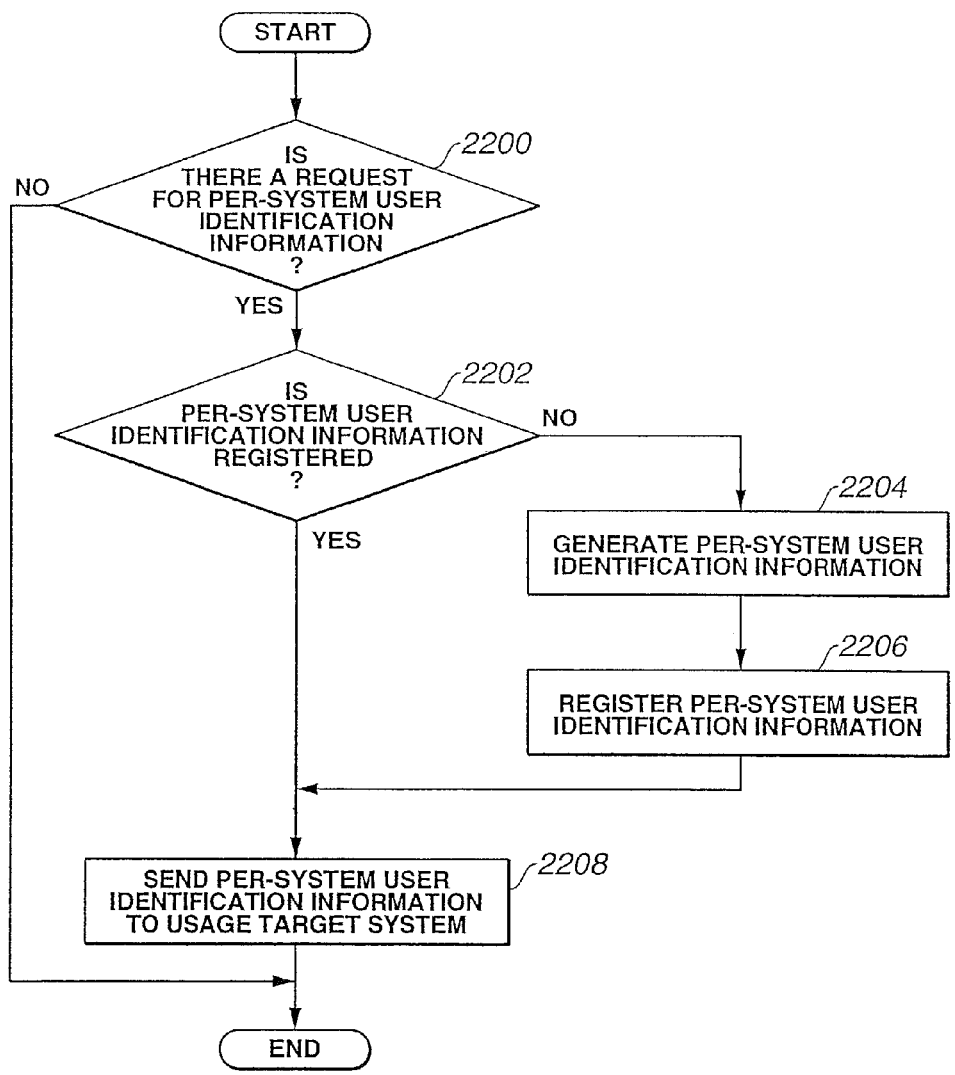
FIG. 26 is a flowchart for explaining processing flow on the verification server 12, in accordance with the present embodiment.

FIG. 24 through FIG. 26 are flowcharts for explaining processing flow at the verification server 12 in accordance with the present embodiment. In the following flowcharts, the processing flows are explained sequentially, but restriction is not particularly made to this processing flow. Therefore, the processing flow may be constructed with the processing sequences switched around or performed in parallel.

As shown in FIG. 24, the verification server 12 receives the verification procedure start message sent by the mobile phone 13, and then extracts the system ID and the user ID therefrom (STEP 2000). Next, since the verification server 12 is waiting for the user verification request from the usage target system 11 indicated by the extracted system ID, the verification server 12 issues an event ID, and registers the extracted system ID and the user ID into a user verification request waiting table such as shown in FIG. 23.

Next, the verification server 12 judges whether or not the temporary identification information is necessary for the user to use the usage target system 11 (STEP 2002). The verification server 12 preferably judges whether or not to generate the temporary identification information based on a request form the user. For example, the verification server 12 may notify the user's mobile phone 13 so as to request information about whether or not the user will use the temporary identification information in the usage target system 11. Then, the verification server 12 judges whether or not to generate the temporary identification information based on the information received via the mobile phone 13 from the user.

Furthermore, the verification server 12 may pre-register information showing whether or not the temporary identification information will be used for the usage target system 11 that the user will use. In such a case, the verification server 12 judges whether or not to generate the temporary identification information based on the pre-registered information, the system ID and the user ID. The information showing whether or not the temporary identification information will be used may be pre-registered for example when the user is registered, or at any time after the user is registered.

In the case where the verification server 12 judges that the temporary identification information is not necessary for the usage target system 11 (No at STEP 2002), the verification server 12 then calls up a predetermined random number generating function, and generates random numbers to generate the presented pattern (STEP 2012). When the verification server 12 generates the presented pattern, the presented pattern is registered into the user verification request waiting table that is described above (STEP 2014). Next, the verification server 12 sends the presented pattern to the user's mobile phone 13 (STEP 2018).

When the verification server 12 judges that the temporary information is necessary for the usage target system 11 (Yes at STEP 2002), the verification server 12 then judges whether or not the temporary identification information is already registered for the usage target system 11 (STEP 2004). Then, when the verification server 12 judges that the temporary identification information has not been registered (No at STEP 2004), new temporary identification information is generated (STEP 2010). The temporary identification information is preferably information generated for example by a random number function, having no relationship to the user ID.

When the verification server 12 judges that the temporary identification information has already been registered (Yes at STEP 2004), based on such things as the amount of time elapsed since that temporary identification information was generated and the number of times that temporary identification information has been received at the server 12, the verification server 12 then judges whether or not that temporary identification information is valid (STEP 2006). Then, when the verification server 12 judges that the temporary identification information is not valid (No at STEP 2006), the temporary identification information is expunged (STEP 2008), and a new temporary identification information is generated (STEP 2010). Then, the verification server 12 registers the newly generated temporary identification information into the verification database 14 and the verification request waiting table (STEP 2011). In the present embodiment, the verification server 12 generates "6584" as the temporary identification information corresponding to the user ID "090xxxx1234", and registers this into the verification database 14 and the verification request waiting table (see FIG. 22 and FIG. 23).

Next, the verification server 12 calls up the predetermined random number generating function, and generates random numeric characters to generate the presented pattern (STEP 2012). When the verification server 12 generates the presented pattern, the verification server 12 registers the presented pattern into the user verification request waiting table (STEP 2014). Then, the verification server 12 sends the temporary identification information and the presented pattern to the user's mobile phone 13 (STEP 2016). When the temporary identification information and the presented pattern are sent to the mobile phone 13, the verification server 12 waits for the user verification request from the usage target system 11.

In the present embodiment, the verification server 12 responds to the verification start message from the user by judging the validity of the temporary identification information that has already been registered, based on such things as the duration of time elapsed since that temporary identification information was generated and the number of times that the temporary identification information has been received at the server 12, but the verification server 12 may also judge the validity of the temporary identification information independently from the processing flow explained in the present diagrams.

As shown in FIG. 25, when the verification server 12 which is waiting for the user verification request receives the user verification request from the usage target system 11 (Yes at STEP 2100), the verification server 12 uses the temporary identification information and the system ID to reference the user verification request waiting table shown in FIG. 23 and identifies the user ID (STEP 2102). The verification server 12, having identified the user ID, then references the verification database 14, and based on the password derivation pattern for that user ID, derives the system internal password from the presented pattern (STEP 2104). In this case, the verification server 12 may use a predetermined conversion rule as in the first embodiment to derive the system internal password from the presented pattern.

Next, the verification server 12 judges whether or not the inputted password that was sent, and the system internal password, match each other (STEP 2106). Then, in the case where the verification server 12 judges that the two passwords do match each other, the verification server 12 then notifies the verification success to the usage target system 11 indicated by the system ID (STEP 2108), but if the two passwords do not match each other, then the verification failure is notified (STEP 2110). The usage target system 11 then performs processing which depends on the verification result notified from the verification server 12.

In the present embodiment, since the temporary identification information is used instead of the user ID, even when the user ID includes for example the mobile phone number or other such information that could possibly identify the user, the user verification processing can be constituted without leaking this information to the usage target system 11. Accordingly, even when using the usage target system 11 for a questionnaire or the like where it is not necessary to identify the user, or when one does not wish to disclose personal information, anonymity can be secured and the system can be used with peace of mind.

FIG. 26 is a flowchart showing processing in which the verification server 12 sends the per-system user identification information to the usage target system 11. When the user inputs the temporary identification information into the usage target system 11 and the usage target system 11 gives approval for usage to that user, the verification server 12 then sends to the usage target system 11 the per-system user identification information that corresponds to the user ID and the usage target system 11 (system ID). In this case, the per-system user identification information is preferably fixed information that distinguishes each of the users per target system 11.

The verification server 12 receives the per-system user identification information request from the usage target system 11 (STEP 2200). Then, when the per-system user identification information request has been received from the usage target system 11 (Yes at STEP 2200), the verification server 12 confirms whether the per-system user identification information for the usage target system 11 has been registered in the verification database 14 (STEP 2202). Then, in the case where the per-system user identification information for the usage target system 11 has not already been registered in the verification database 14, the verification server 12 generates the per-system user identification information for the usage target system 11 (STEP 2204) and registers this into the verification database 14 (STEP 2206). In the present embodiment, the verification server 12 generates "125897" as the per-system user identification information for the usage target system 11 (system ID "36578980") of the user (user ID "090xxxx1234"), and registers this identification information into the verification database 14. Note that, for the system IDs "36578979" and "36578981", the per-system user identification information "125896" and "125898" have been pre-registered into the verification database 14.

Next, the verification server 12 sends the per-system user identification information to the usage target system 11 (STEP 2208). In this case, when the verification server 12 has for example the user's usage target system 11 usage frequency, which is user information for the usage target system 11, the verification server 12 may also send this information. Furthermore, in the present embodiment, the verification server 12 sends the per-system user identification information to the usage target system 11, but instead of this it is also possible to send the temporary identification information as the per-system user identification information to the usage target system 11.

In the present embodiment, the verification server 12 provides the per-system user identification information to the usage target system 11, whereby the usage target system 11 can specify the user using the usage target system 11. That is, even in the case were the user uses the temporary identification information, the usage target system 11 can judge the identity of the user. Accordingly, the usage target system 11 can have information such as whether that user is a user who previously used the usage target system 11, or the like. That is, the usage target system 11 can use the per-system user identification information to build the data for the user information in the usage target system 11, to provide service adapted for each user.

Figure 27:
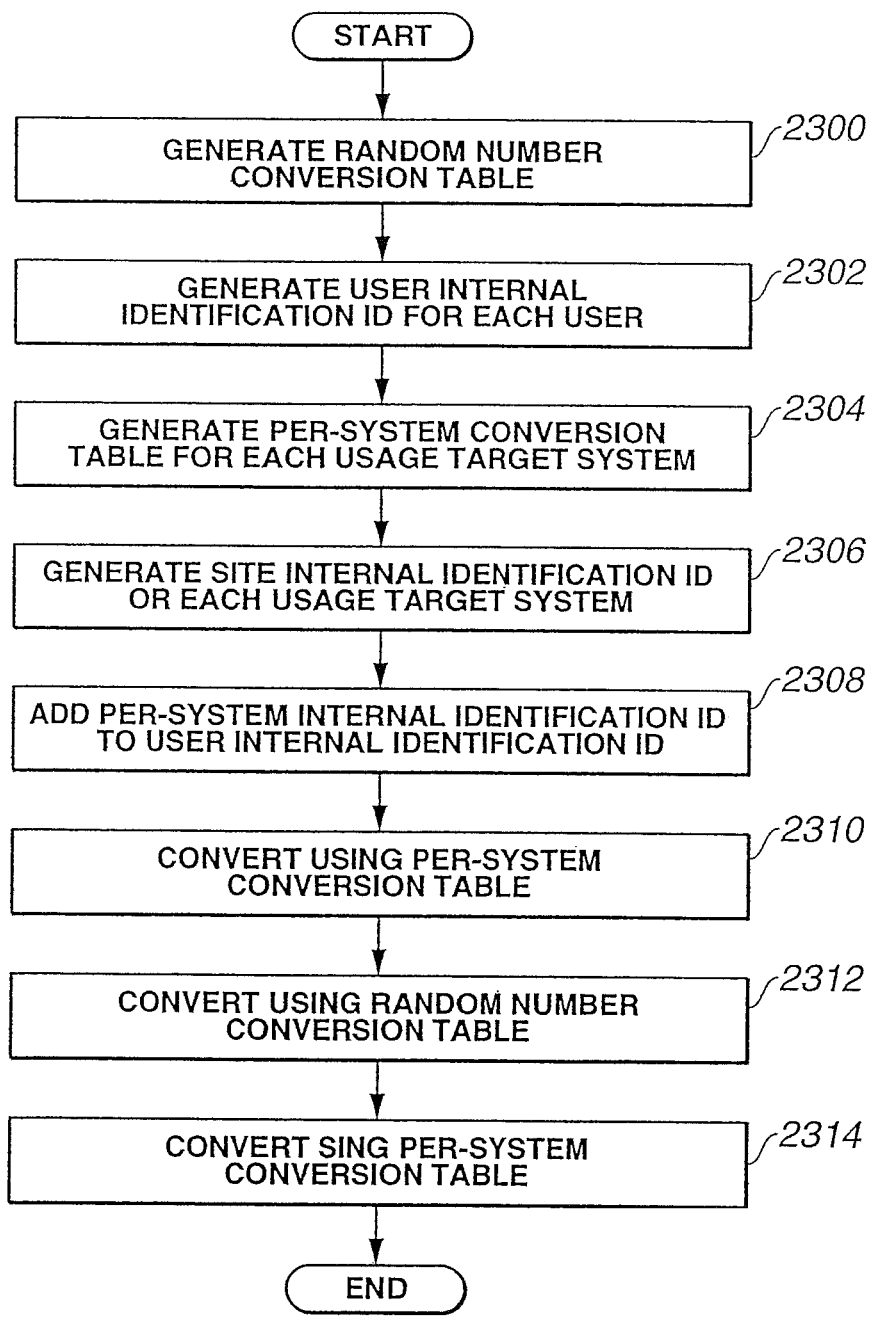
FIG. 27 is a flowchart showing processing for generating per-system identification information.

FIG. 27 is a flowchart showing the processing (S2204 in FIG. 26) for generating the per-system user identification information. First, the verification server 12 generates the random number conversion table (STEP 2300). The random number conversion table is preferably generated according to the letters, numerals and other numeric characters included in the per-system user identification information that was generated. For example, in a case where the per-system user identification information is constituted by an M-digit numeric character string (where M is a natural number), the random number conversion table may be a random number conversion table for making a 1-to-1 conversion of the M-digit numeric character string into a different M-digit numeric character string (of random numbers) that is different. In other words, this is a random number table for converting each M-digit numeric character string (the number of which is M-plex) into a different M-digit numeric character string (the number of which is M-plex). In the present embodiment, the per-system user identification information that is generated is constituted of a 6-digit numeric character string, and so a random number table having 1,000,000 different 1-to-1 conversion patterns generated. The server 12 preferably uses the same random number table for each user. That is, in a case where the random number table has already been generated, the present step may be omitted.

The per-system user identification information may also be constituted by a numeric character string having the same number of digits as the user ID, or may be constituted with a different number of digits. Furthermore, the random number conversion table is preferably registered in the verification database 14.

Next, the verification server 12 generates the per user internal identification ID for identifying the user within the verification server 12. The per user internal identification ID preferably is not notified to the user and the usage target system 11. In the present embodiment, the per user internal identification ID is a numeric character string having the same number of digits as the user ID, but it may also be a numeric character string having a different number of digits from the user ID. The per user internal identification ID is preferably registered in the verification database 14.

Next, the verification server 12 generates a per system conversion table for each usage target system 11 (STEP 2304). The per system conversion tables preferably are not notified to the usage target systems 11. The per system conversion table may be a numeral-conversion-table that converts predetermined numerals included in a predetermined numeric character string into other numerals, or may be a digit-position-conversion-table that switches around a predetermined number of digits of numerals with another predetermined number of digits of numerals in a numeric character string having a predetermined number of digits with other, or may be a number-of-digits-conversion-table that changes the number of digits in the numeric character string by deleting a predetermined number of digits of numerals from or inserting a predetermined number of numerals into a numeric character string having a predetermined number of digits. In this case, the conversion is preferably performed such that at least within the same usage target system 11 there is no overlap in the results produced by converting the number of digits. The per system conversion table is preferably registered in the conversion table.

Next, the verification server 12 generates, for each usage target system 11, a per system internal identification ID for identifying the usage target system 11 within the verification server 12 (STEP 2306). The per system internal identification ID preferably is not notified to the user and the usage target system 11. In the present embodiment, the per system internal identification ID is a numeric character string having the same number of digits as the user ID, but it may also be a numeric character string having a different number of digits from the user ID. The per system internal identification ID is preferably registered in the verification database 14.

Next, the verification server 12 adds the per system internal identification ID to the per user internal identification ID (STEP 2308). By adding the internal identification ID generated for each user to the internal identification ID generated for each usage target system 11, the security level can be raised. In a case where adding the figure at predetermined digit of the per user internal identification ID to the figure at predetermined digit of the per system internal identification ID increases the number of characters at the predetermined digits, the verification server 12 may perform processing to delete the characters in the increased digits, so that the number of digits of characters after the adding does not exceed the number of digits in the per user internal identification ID and the per system internal identification ID. Furthermore, the verification server 12 may add the per user internal identification ID and the per system internal identification ID, so as to calculate a numeric character string having a different number of digits than the per user internal identification ID and/or the per system internal identification ID. The verification server 12 may also do computations of per user internal identification ID and the per system internal identification ID by subtraction, multiplication, division, or other computational method.

Next, the verification server 12 uses the above-mentioned per system conversion table to convert the computational result from STEP 2308 (STEP 2310). In the present embodiment, the verification server 12 converts the addition result from STEP 2308 by using the digit-position-conversion-table. Then, the verification server 12 uses the number-of-digits-conversion-table to convert the addition result produced by the converting the digit positions, into the 6-digit numeric character string, which is the number of digits contained in the random number conversion table.

Next, the verification server 12 uses the above-mentioned random number conversion table to further convert the conversion result produced at STEP 2310 (STEP 2312). In the present embodiment, the verification server 12 converts the conversion result from STEP 2310 into a 6-digit numeric character string (of random numbers), which is the same number of digits as the conversion result. By using the random number conversion table to perform the conversion, it becomes difficult to analyze the conversion result, thus enabling the security level to be raised.

Next, the verification server 12 uses the above-mentioned per system conversion table to further convert the result of the conversion that was produced at STEP 2312 (STEP 2314). In the present embodiment, the verification server 12 converts the conversion result from STEP 2312 by means of the numerical conversion table, and thus obtains per-system user identification information. Accordingly, the security level can be raised further.

In the present embodiment, for each user, and for each usage target system 11, there is prepared a different internal identification ID and conversion table, and since conversions are performed based thereupon, the security level can be raised further. In particular, in the present embodiment the conversions are performed based on the random number conversion table, so it is extremely difficult to use the conversion result to obtain the information from before the conversion. That is, from the conversion result is it is extremely difficult to identify the user's personal information, and thus the security level can be raised even higher. Furthermore, because of this, for each usage target system 11, different per-system user identification information can be generated. Moreover, for predetermined users, the identification information (the per-system user identification information) is generated for each usage target system 11, whereby across a plurality of usage target systems 11, one can be prevented from using information that is sent from the verification server 12 compare the user information or the like, thus preventing sharing of information across usage target systems 11.

Sixth Embodiment

The present embodiment relates to a method of verifying the password inputted from the usage target system 11. Hereinafter, explanation is given regarding the password verification method in accordance with the present embodiment, using an example in which the password inputted into the usage target system 11, matches a numeric character string containing a predetermined numeric character, at a predetermined digit of the system internal password.

Figure 28:
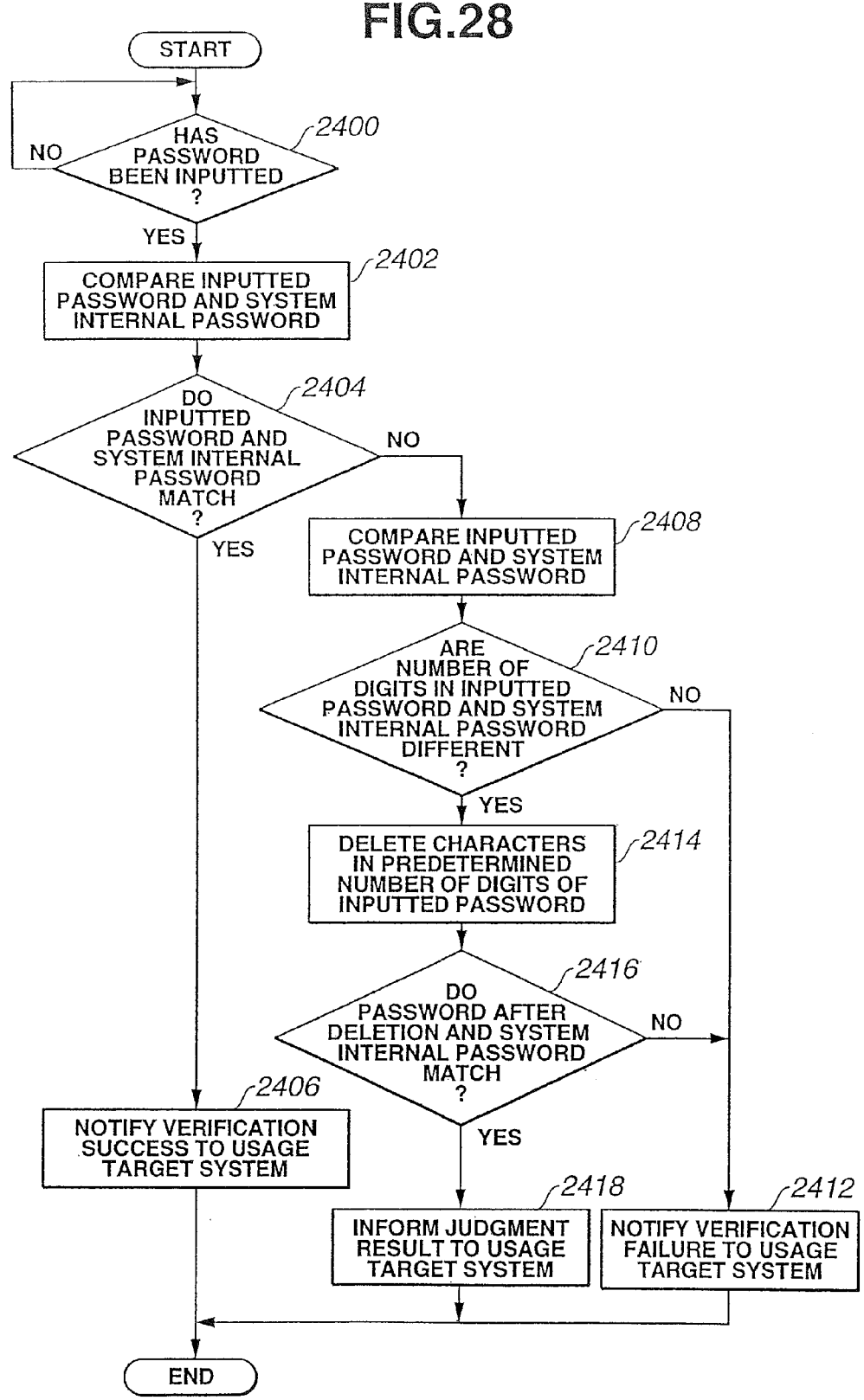
FIG. 28 is a flowchart showing a password verification method.

FIG. 28 is a flowchart showing a password verification method. First, the verification server 12 receives the password inputted from the usage target system 11 (Yes at STEP 2400), and then compares the inputted password and the system internal password (STEP 2402). When the inputted password and the system internal password match each other (Yes at STEP 2404), the verification server 12 then notifies the usage target system 11 that the verification has succeeded (STEP 2406).

When the inputted password and the system internal password do not match (No at STEP 2404), the verification server 12 compares the inputted password and the system internal password (STEP 2408). In the present embodiment, the verification server 12 compares the number of digits in the inputted password and the number of digits in the system internal password (STEP 2410). Then, when the number of digits in the inputted password and the number of digits in the system internal password match (No at STEP 2410), the verification server 12 notifies the usage target system 11 that the verification has failed (STEP 2412).

The password given as an example in the present embodiment is "45871", and the system internal password is "4587". That is, the verification server 12 judges that the inputted password and the system internal password do not match each other, and also judges that they have different numbers of digits, respectively.

When the number of digits in the inputted password and the number of digits in the system internal password are different (Yes at STEP 2410), the verification server 12 then deletes the numeric character included at a designated position, which is a predetermined position, in the inputted password (STEP 2414). In the present embodiment, the predetermined position is the "1" digit, which is the digit furthest to the right, and the verification server 12 deletes the numeric character "1" from the "1" digit in the inputted password "45871", thus obtaining "4587". That is, from the inputted password having five digits, the predetermined number of numeric characters is deleted, whereby obtaining the 4-digit password.

The designated position in the password is preferably registered beforehand in the verification database 14. The designated position may be determined in correspondence with each usage target system 11. In the present embodiment, the designated position in the password is registered beforehand into the verification server 12, and the verification server 12 reads out the "1" digit as the designated position from the verification database 14, and deletes the numeric character in the "1" digit of the inputted password.

Next, the verification server 12 judges whether or not the inputted password after the predetermined numeric character has been deleted, and the system internal password, match each other (STEP 2416). Then, when it is judged that there is no match (No at STEP 2416), the verification server 12 notifies the usage target system 11 that the verification has failed (STEP 2412).

When the verification server 12 has judged that the inputted password with the predetermined numeric character deleted, and the system internal password, do match each other (Yes at STEP 2416), the verification server 12 notifies the usage target system 11 that the verification has succeeded, and that predetermined processing is to be performed (STEP 2418). Hereinafter, explanation is given regarding a method by which the verification server 12 judges the processing that should be notified to the usage target system 11.

FIG. 29 is a diagram showing a function code database, where processing notified to the used target system 11 is associated with a function code that corresponds to that processing and is constituted of predetermined characters. In this way, the verification server 12 links, and pre-registers, a function code which should be included in the designated position of the password inputted to the verification database 14, and processing that should be notified to the used target system 11. Then, the verification server 12, based on deleted characters included in the designated position of the inputted password, extracts the processing that should be notified to the used target system 11 from the function code database, and notifies this to the used target system 11. A plurality of designated positions may be designated for one password. Furthermore, the function code may be multi-digit numeric characters, or may be text or pictorial text or the other such characters.

For example, in a case where the deleted character is "0", the verification server 12 notifies the used target system 11 that this is for practice. Then, the used target system 11 provides the user with a service for practicing. Furthermore, when the deleted character is "2", the verification server 12 notifies the used target system 11 that an emergency situation has occurred. Then, the used target system 11, for example, notifies the police or the like, or locks the user ID, the temporary identification information and the per-system user identification information, or performs other such processing. Furthermore, in a case where the used target system 11 is a bank system, and the user verification has already been performed so that the user can make a deposit in a predetermined account, zero yen may be set as the amount of the account deposit, or the like may be performed to create an appearance that an amount of money designated by the user has been deposited, by displaying a dummy screen on the screen of the used target system 11. Accordingly, even in a case where, for example, a user is threatened into using the used target system 11, the user can inform the verification server 12 and the used target system 11 that an emergency situation has occurred, without being noticed by the other person.

Furthermore, in a case where the deleted character is 9, the verification server 12 references the function code database, judges that the deleted character is a dummy, and notifies the used target system 11 that the user verification has succeeded. In this case, the verification server 12 may also notify the used target system 11 that the dummy was included as the function code.

In the present embodiment, the inputted password is "45871", and the system internal password is "4587". Therefore, the verification server 12 extracts the numeral "1" as the designated character. Then, the verification server 12 references the function code database included in the verification database 14, and notifies the used target system 11 that the confirmation has succeeded and that it is for reading only. Then, the used target system 11 provides read only services to the user. The read only services are, for example, showing a bank account balance, viewing message boards, and other such services. Accordingly, the user can obtain a read-only password that only enables the user to view the account balance, for example, and which is generated each time the user verification is performed, and enables the user to request another person to use the password to let another person view the account balance, without the other person knowing that that password is for reading only.

In accordance with the present embodiment, by including the predetermined characters in the password, the user can request the verification server 12 and/or the used target system 11 for predetermined processing, without another person knowing. Furthermore, by including the predetermined character in the password, simply by inputting the password, the verification server 12 and/or the used target system 11 can be requested to perform multiple processing. Furthermore, in accordance with the present embodiment, by including the predetermined characters in the password, the number of digits of the inputted password increases, and thus the security level of the password can be raised further.

Seventh Embodiment

The present embodiment relates to a verification method in which someone other than the user inputs the password from the used target system 11 to perform verification of the user.

Figure 30:
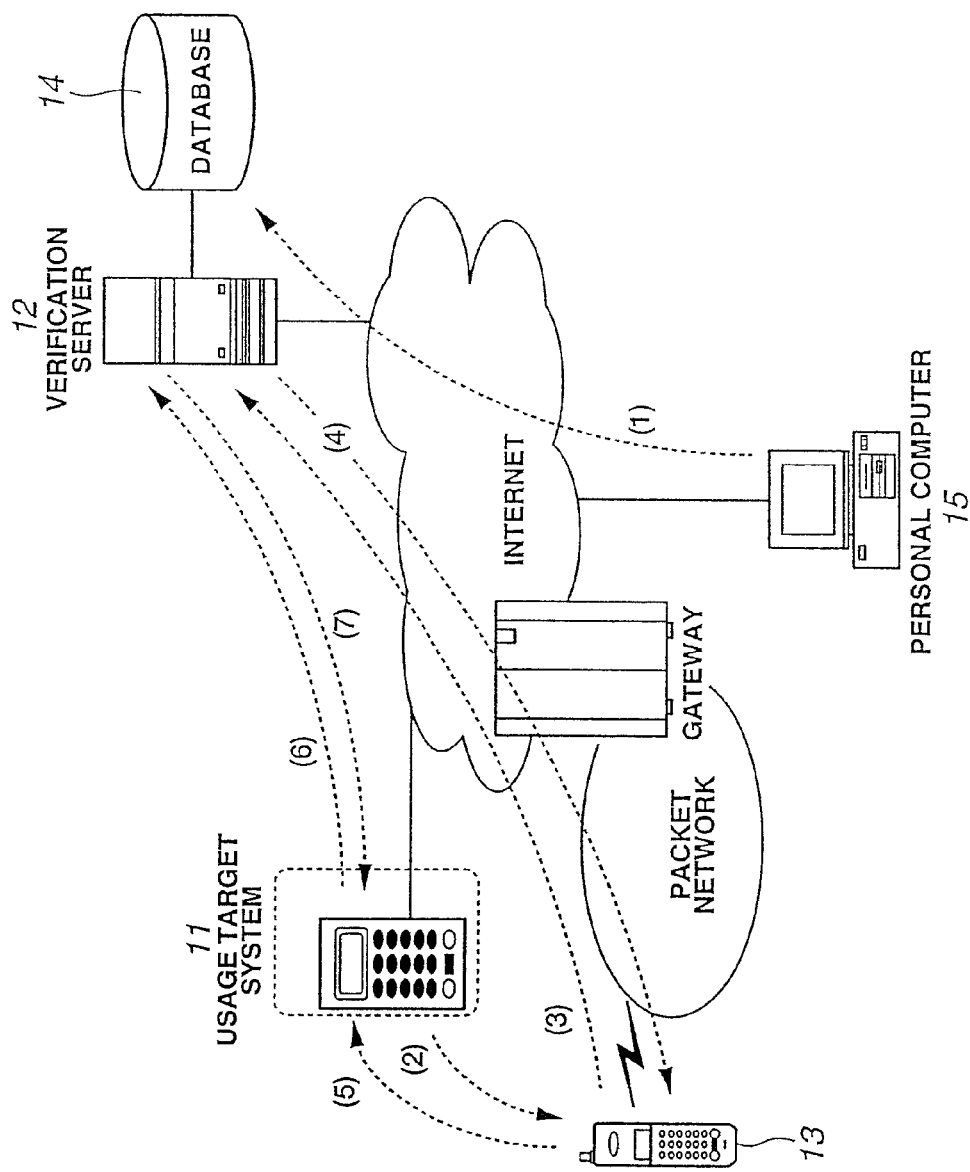
FIG. 30 is a summary diagram for explaining an overall scheme of the user verification method, in accordance with the present embodiment.

FIG. 30 is a conceptual diagram for explaining an overall scheme of the user verification method in accordance with the present embodiment. First, the user uses the personal computer 15, and pre-registers his or her own password derivation pattern for the used target system 11, along with the personal information that is necessary for using the used target system 11, into the verification database 14 ((1) in the diagram. The user then obtains the system ID of the used target system 11 from a confirmer who will try to use the used target system 11 to confirm the identity of the user him- or herself ((2) in the diagram). For example, the user obtains the confirmer's ID for the used target system 11, via television, radio, magazine, or other information medium.

Next, the user inputs that system ID into the mobile phone 13, and sends to the verification server 12 ((3) in the diagram). The verification server 12 receives this transmission, generates the random number table, and sends this to the user's mobile phone 13 as the presented pattern ((4) in the diagram). At this time, the verification server 12 may send the temporary information to the user's mobile phone 13. The user references the presented pattern displayed on the mobile phone 13, and then derives the element value sequence (password) assigned to the user's own password derivation pattern, and notifies this to the confirmer ((5) in the diagram). For example, the user may use a telephone, electronic mail or other information transmission means to notify the password to the confirmer. At this time, the user may also inform the temporary identification information to the confirmer. The confirmer inputs the password and/or the temporary identification information that were notified form the user. Accordingly, the used target system 11 sends the inputted password and/or the temporary identification information to the verification server 12 ((6) in the diagram).

The verification server 12 receives the password from the used target system 11, and then compares the numeric character string obtained from the user's password derivation pattern which is already registered and the presented pattern that was generated, against the password that was sent form the used target system 11, to judge whether these match each other. The verification server 12 then notifies verification success when they do match, and verification failure otherwise, to the used target system 11 indicated by the system ID ((7) in the diagram). Then, in the case of the user confirmation success, the confirmer then uses the used target system 11 to obtain from the verification server 12 the necessary personal information for that user.

In the present embodiment, the "confirmer" is, for example, a telephone shopping company, a hotel professional who has received a reservation for lodgings, a real estate professional who has received a request to rent, issuers of various types of personal identification documentation, a credit company giving credit or settling an account, a doctor perform a medical consultation, or the like. Furthermore, the "necessary personal information" is, for example, the user's address, telephone number, credit card number, savings account, medical records, medical files, resume, place of work, or other such information relating the user. The user may restrict the personal information that is opened to the confirmer using the used target system 11. For example, when the user sends the system ID from the mobile phone 13 to the verification server 12, the user can input a code to restrict disclosure of the personal information and send this to the verification server 12.

The present invention provides the new user verification method and system for achieving the same, which effectively prevent illegitimate access to a system by a third party.

Furthermore, the present invention can provide the user verification method and the system for achieving the same, which maximally utilize existing system infrastructure, without incurring extra cost burdens.

Furthermore, the present invention can provide the user verification method and the system for achieving the same, which can effectively prevent the illegitimate access to the system by the third party, while on the other hand facilitating password management by the user and being convenient to use for every user.

I claim:

1. A method of verifying a user, performed by a verification server, the method comprising:
    registering personal information of a user for using a usage target system;
    receiving, via a second communication channel, system identification information of the usage target system and a restriction code from an information terminal device owned by a user;
    generating an internal system password for the usage target system;
    receiving, via a first communication channel, a plurality of characters from the usage target system, the plurality of characters being inputted by a user into the usage target system;
    determining whether the plurality of characters are legitimate based on the internal system password and the system identification information;
    sending, via the first communication channel, a result of the determination made to the usage target system;
    restricting the personal information of the user to be provided to the usage target system based on the restriction code; and
    sending, via the first communication channel, the restricted personal information to the usage target system.

2. The method according to claim 1, further comprising:
    registering a password derivation pattern for a usage target system, the password derivation pattern being based on at least one specific element selected from a plurality of elements constituting a predetermined pattern;
    generating a presentation pattern in which a plurality of predetermined characters are assigned to a plurality of elements constituting the predetermined pattern; and
    sending, via a second communication channel, the presentation pattern to an information terminal device to cause the information terminal device to display a screen containing the presentation pattern thereon and thereby to allow the user to input the plurality of characters assigned to the at least one specific element corresponding to the password derivation pattern into the usage target system,
    wherein the generating of the internal system password is based on the password derivation pattern and the presentation pattern.

3. The method according to claim 2, further comprising:
    generating temporary identification information which is assigned to user identification information for identifying the user; and
    sending the temporary identification information and the presentation pattern to the information terminal device.

4. The method according to claim 3, further comprising:
receiving the temporary identification information from the usage target system; and
identifying the internal system password of the user in accordance with the temporary identification information.

5. A verification server configured to communicate with a usage target system via a first communication channel and an information terminal device via a second communication channel, the verification server comprising:
a memory; and
a processor that:
registers in the memory personal information of a user for using a usage target system;
receives, via the second communication channel, system identification information of the usage target system and a restriction code from an information terminal device owned by a user;
generates an internal system password for the usage target system;
receives, via the first communication channel, a plurality of characters from the usage target system, the plurality of characters being inputted by a user into the usage target system;
determines whether the plurality of characters are legitimate based on the internal system password and the system identification information;
sends, via the first communication channel, a result of the determination made to the usage target system;
restricts the personal information of the user to be provided to the usage target system based on the restriction code; and
sends, via the first communication channel, the restricted personal information to the usage target system.

6. The verification server according to claim 5, wherein the processor:
registers a password derivation pattern for a usage target system, the password derivation pattern being based on at least one specific element selected from a plurality of elements constituting a predetermined pattern;
generates a presentation pattern in which a plurality of predetermined characters are assigned to a plurality of elements constituting the predetermined pattern; and
sends, via the second communication channel, the presentation pattern to an information terminal device to cause the information terminal device to display a screen containing the presentation pattern thereon and thereby to allow the user to input the plurality of characters assigned to the at least one specific element corresponding to the password derivation pattern into the usage target system, and
the generating of the internal system password is based on the password derivation pattern and the presentation pattern.

7. The verification server according to claim 6, wherein the processor:
generates temporary identification information which is assigned to user identification information for identifying the user; and
sends the temporary identification information and the presentation pattern to the information terminal device.

8. The verification server according to claim 7, wherein the processor:
receives the temporary identification information from the usage target system; and
identifies the internal system password of the user in accordance with the temporary identification information.

9. A method of verifying a user, performed by a verification server, the method comprising:
generating an internal system password for a usage target system;
receiving, via a first communication channel, a plurality of characters from the usage target system, the plurality of characters being inputted by a user into the usage target system;
comparing the number of characters of the received plurality of characters with the number of characters of the internal system password;
if the number of characters of the received plurality of characters and the number of characters of the internal system password are different, deleting at least one character at a predetermined position from the received plurality of characters to generate a user password;
determining whether the user password is legitimate based on the internal system password; and
sending, via the first communication channel, a result of the determination made to the usage target system.

10. The method according to claim 9, further comprising:
registering a password registering a password derivation pattern for a usage target system, the password derivation pattern being based on at least one specific element selected from a plurality of elements constituting a predetermined pattern;
generating a presentation pattern in which a plurality of predetermined characters are assigned to a plurality of elements constituting the predetermined pattern; and
sending, via a second communication channel, the presentation pattern to an information terminal device to cause the information terminal device to display a screen containing the presentation pattern thereon and thereby to allow the user to input the plurality of characters assigned to the at least one specific element corresponding to the password derivation pattern into the usage target system,
wherein the generating of the internal system password is based on the password derivation pattern and the presentation pattern.

11. The method according to claim 9, wherein the sending of the presentation pattern including notifying the usage target system of a predetermined task corresponding the deleted at least one character to allow the usage target system to perform the predetermined task.

12. A verification server configured to communicate with a usage target system via a first communication channel and an information terminal device via a second communication channel, the verification server comprising:
a memory; and
a processor that:
generates an internal system password for a usage target system;
receives, via a first communication channel, a plurality of characters from the usage target system, the plurality of characters being inputted by a user into the usage target system;
compares the number of characters of the received plurality of characters with the number of characters of the internal system password;
deletes, if the number of characters of the received plurality of characters and the number of characters of the internal system password are different, at least one character at a predetermined position registered in the memory from the received plurality of characters to generate a user password;

determines whether the user password is legitimate based on the internal system password; and sends, via the first communication channel, a result of the determination made to the usage target system.

13. The verification server according to claim 12, wherein the processor:

registers a password registering a password derivation pattern for a usage target system, the password derivation pattern being based on at least one specific element selected from a plurality of elements constituting a predetermined pattern;

generates a presentation pattern in which a plurality of predetermined characters are assigned to a plurality of elements constituting the predetermined pattern; and sends, via a second communication channel, the presentation pattern to an information terminal device to cause the information terminal device to display a screen containing the presentation pattern thereon and thereby to allow the user to input the plurality of characters assigned to the at least one specific element corresponding to the password derivation pattern into the usage target system, and the internal system password is generated based on the password derivation pattern and the presentation pattern.

14. The verification server according to claim 12, wherein the processor notifies the usage target system of a predetermined task corresponding to the deleted at least one character to allow the usage target system to perform the predetermined task.

* * * * *

UNITED STATES PATENT AND TRADEMARK OFFICE
CERTIFICATE OF CORRECTION

PATENT NO.         : 9,608,986 B2                                        Page 1 of 1
APPLICATION NO.    : 14/322577
DATED              : March 28, 2017
INVENTOR(S)        : Hideharu Ogawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 278 days.

Signed and Sealed this

Twenty-fifth Day of September, 2018

Andrei Iancu
*Director of the United States Patent and Trademark Office*